TRAFFIC MONITOR FOR ELECTRONIC TELEPHONE SYSTEM

Filed March 18, 1955 21 Sheets-Sheet 1

INVENTOR.
Robert B. Trousdale
BY T. L. Bowes
Att'y

TRAFFIC MONITOR FOR ELECTRONIC TELEPHONE SYSTEM

Filed March 18, 1955 21 Sheets-Sheet 2

INVENTOR.
Robert B. Trousdale
BY T. L. Bowes
Att'y

INVENTOR.
Robert B. Trousdale
BY
T. L. Bowes
Att'y

July 1, 1958 R. B. TROUSDALE 2,841,657

TRAFFIC MONITOR FOR ELECTRONIC TELEPHONE SYSTEM

Filed March 18, 1955 21 Sheets-Sheet 4

INVENTOR.
Robert B. Trousdale
BY
T. L. Bowes
Att'y

INVENTOR.
Robert B. Trousdale
BY J. L. Bowes
Att'y

INVENTOR.
Robert B. Trousdale
BY T. L. Bowes
Att'y

TRAFFIC MONITOR FOR ELECTRONIC TELEPHONE SYSTEM

Filed March 18, 1955 21 Sheets-Sheet 7

INVENTOR.
Robert B. Trousdale

BY T. L. Bowes
Att'y

July 1, 1958 R. B. TROUSDALE 2,841,657

TRAFFIC MONITOR FOR ELECTRONIC TELEPHONE SYSTEM

Filed March 18, 1955 21 Sheets-Sheet 8

INVENTOR.
Robert B. Trousdale
BY T. L. Bowes
Att'y

INVENTOR.
Robert B. Trousdale
BY
T. L. Bowes
Att'y

July 1, 1958 R. B. TROUSDALE 2,841,657

TRAFFIC MONITOR FOR ELECTRONIC TELEPHONE SYSTEM

Filed March 18, 1955 21 Sheets-Sheet 10

INVENTOR.
Robert B. Trousdale
BY
T. L. Bowes
Att'y

INVENTOR.
Robert B. Trousdale
BY
T. L. Bowes
Att'y

HORIZONTAL SWEEP CIRCUIT -501

INVENTOR.
Robert B. Trousdale
BY T. L. Bowes
Att'y

TRAFFIC MONITOR FOR ELECTRONIC TELEPHONE SYSTEM

Filed March 18, 1955 21 Sheets-Sheet 13

INVENTOR.
Robert B. Trousdale
BY T. L. Bowes
Att'y

TRAFFIC MONITOR FOR ELECTRONIC TELEPHONE SYSTEM

Filed March 18, 1955 21 Sheets-Sheet 14

INVENTOR.
Robert B. Trousdale
BY
T. L. Bowes
Att'y

TRAFFIC MONITOR FOR ELECTRONIC TELEPHONE SYSTEM

Filed March 18, 1955 21 Sheets-Sheet 15

INVENTOR.
Robert B. Trousdale
BY T. L. Bowes
Att'y

July 1, 1958 R. B. TROUSDALE 2,841,657

TRAFFIC MONITOR FOR ELECTRONIC TELEPHONE SYSTEM

Filed March 18, 1955 21 Sheets-Sheet 16

INVENTOR.
Robert B. Trousdale
BY T. L. Bowes
Att'y

INVENTOR.
Robert B. Trousdale
BY T. L. Bowes
Att'y

TRAFFIC MONITOR FOR ELECTRONIC TELEPHONE SYSTEM

Filed March 18, 1955 21 Sheets-Sheet 18

INVENTOR.
Robert B. Trousdale
BY T. L. Bowes
Att'y

July 1, 1958 R. B. TROUSDALE 2,841,657

TRAFFIC MONITOR FOR ELECTRONIC TELEPHONE SYSTEM

Filed March 18, 1955 21 Sheets-Sheet 19

INVENTOR.
Robert B. Trousdale
BY T. L. Bowes
Att'y

INVENTOR.
Robert B. Trousdale
BY T. L. Bowes
Att'y

TRAFFIC MONITOR FOR ELECTRONIC TELEPHONE SYSTEM

Filed March 18, 1955

Inventor
Robert B. Trousdale
BY T. L. Bowes
Att'y

United States Patent Office 2,841,657

Patented July 1, 1958

2,841,657

TRAFFIC MONITOR FOR ELECTRONIC TELEPHONE SYSTEM

Robert B. Trousdale, Webster, N. Y., assignor, by mesne assignments, to General Dynamics Corporation, a corporation of Delaware Application March 18, 1955, Serial No. 495,150

30 Claims. (Cl. 179—175.2)

Figures 1, 6:
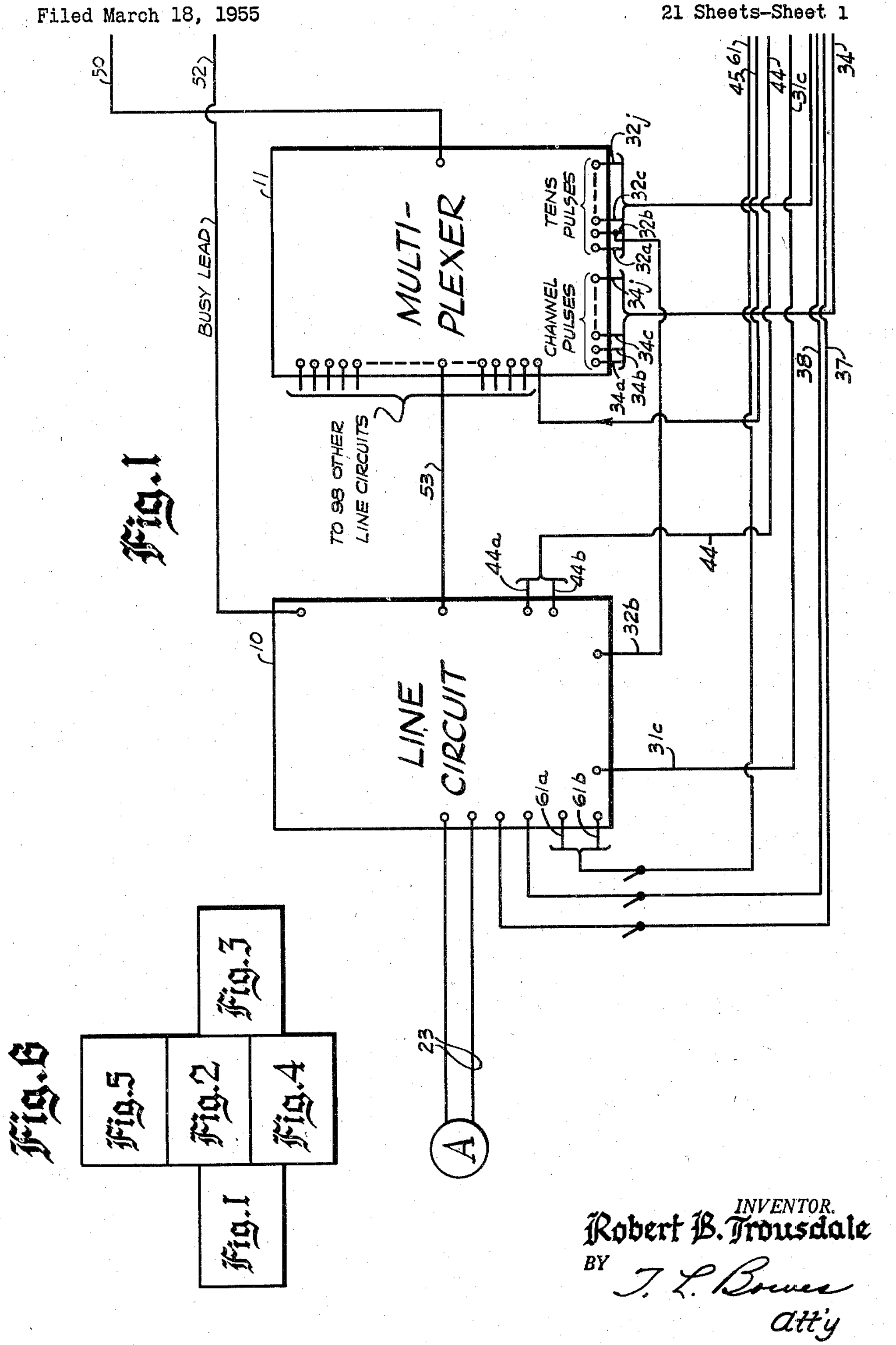

The present invention relates to automatic telephone systems and, more particularly, to a traffic monitor wherein facilities are provided for maintaining a continuous visual survey of the operation of an automatic telephone system. While the invention is of general utility, it is particularly suitable for use with and will be described in connection with an electronic telephone system of the type described and claimed in the copending application of Frank A. Morris and Robert B. Trousdale, S. N. 134,974, filed on December 24, 1949, and assigned to the same assignee as the present invention.

The electronic telephone system described in the above identified copending application employs a system of multiplexing, namely pulse sampling effectively at an ultrasonic rate of the control and intelligence signals produced at each substation of the system, to provide signal channel separation. Specifically, each line or substation of the system is assigned a particular pulse time position in each of repetitive pulse frames each comprising one hundred pulse time positions.

In order to minimize the amount of equipment used in certain components of the system, a decimal system of multiplexing is employed which entails arbitrary division of the lines of the system into subgroups. More specifically, the one hundred lines of the system are divided into ten subgroups of ten lines each, and tens multiplexing or gating pulses are developed at the rate of ten pulses for each pulse frame. Each tens pulse individually corresponds to a particular subgroup of ten lines and occurs during the time interval of each pulse frame which exactly spans the ten pulse time positions individually assigned to the lines of the particular subgroup. With this system of multiplexing, transmission of signal pulses through the signal transmission components of the system is dependent upon time coincidence of these signal pulses with particular tens pulses of successive pulse frames as well as coincidence of these pulses with a particular units pulse time position within successive pulse frames.

In many instances it is desirable to provide an arrangement for monitoring or checking the operation of the telephone system. For example, the wire chief or other supervisor responsible for the operation of the system may wish to check the traffic conditions in the electronic telephone exchange. In such situations it is desirable to provide information as to the number and identity of calling lines (lines off hook), the linkage involved in calls, and the number and identity of lines being called or receiving linkage. In conventional electromechanical systems a so-called peg counter is employed to count the number of calls placed during a given period for traffic checking purposes. However, such an arrangement merely determines the number of completed calls and gives no information as to the identity of the lines involved in each call or the use condition of the lines. Furthermore, peg counters are usually required for each trunk so that a number of counters must be used each of which must be read at the appropriate time.

Accordingly, it is an object of the present invention to provide new and improved methods and apparatus for monitoring the operation of an automatic telephone system.

It is another object of the present invention to provide new and improved methods and apparatus for monitoring an electronic telephone system of the pulse multiplex type wherein a continuous traffic check of all lines of the system may be made at a common monitoring station.

It is a further object of the present invention to provide new and improved methods and apparatus for monitoring an electronic telephone system of the decimal multiplex type in which the lines of the system are arbitrarily divided into subgroups, wherein the use condition of all of the lines of the system is continuously and simultaneously displayed to permit visual checking thereof.

It is a still further object of the present invention to provide a new and improved monitor system for an electronic telephone system wherein a plurality of waveforms which are developed as telephonic connections are set up may be simultaneously displayed in accordance with the identity of the calling and called lines involved in the connections.

It is another object of the present invention to provide a new and improved monitoring system for an electronic telephone system of the pulse multiplex type wherein the off hook condition, seizure of the line by linkage, selection of a called line by the seized linkage, ringing of the selected called line, answering at the called line and signal transmission between the lines may be simultaneously displayed for each line of the system.

Figure 2:
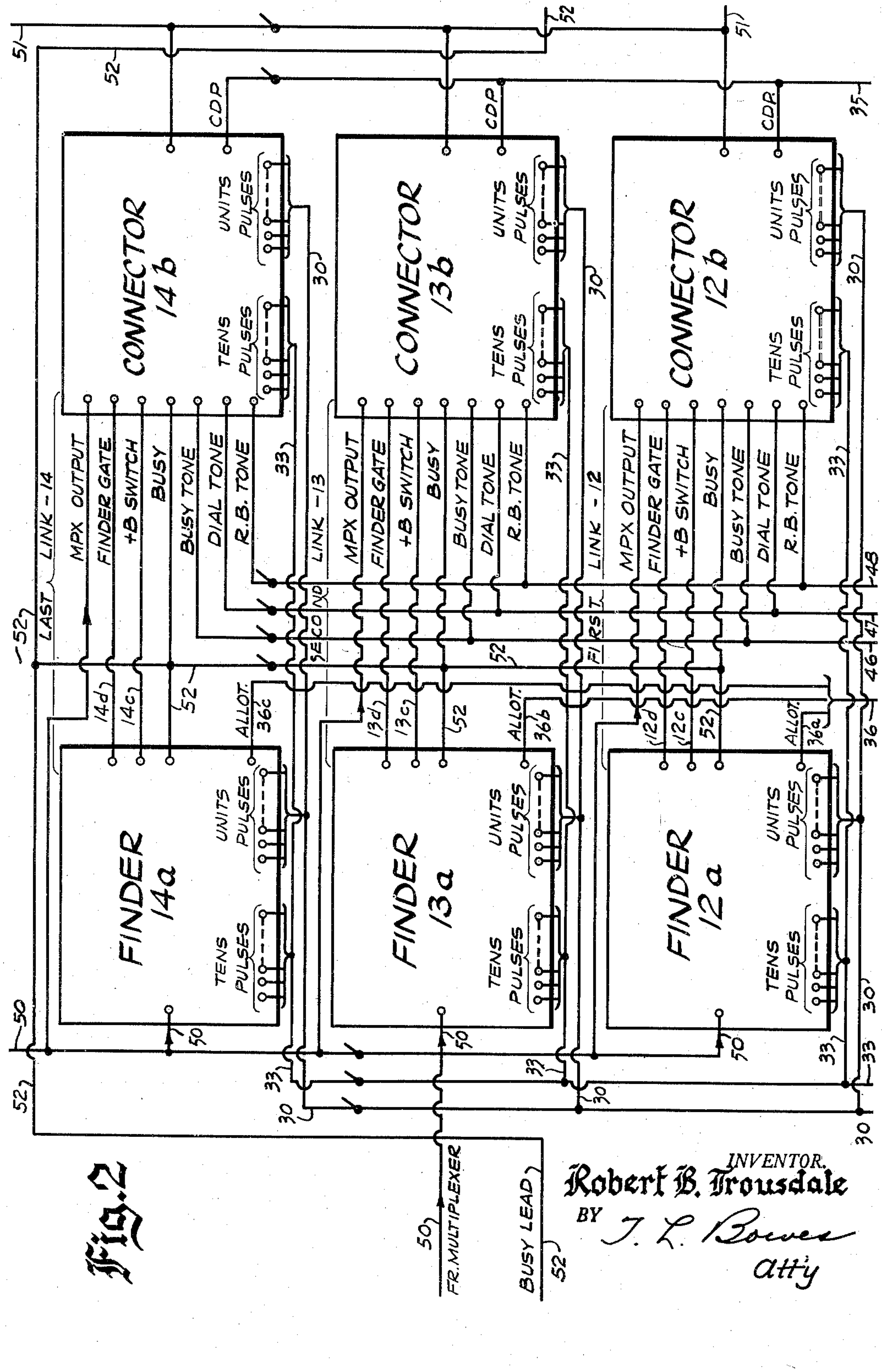
Figure 2A:
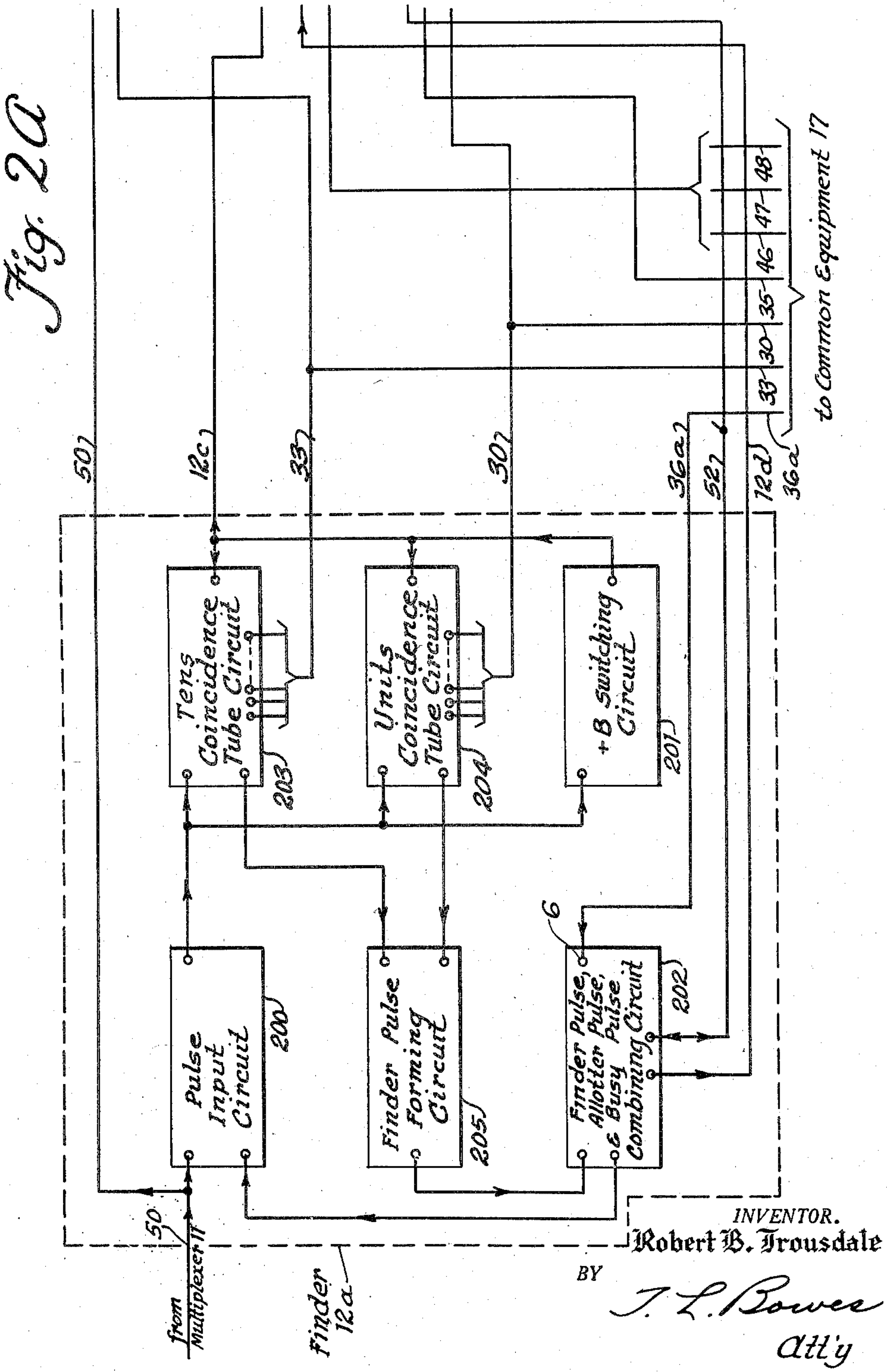
Figure 2B:
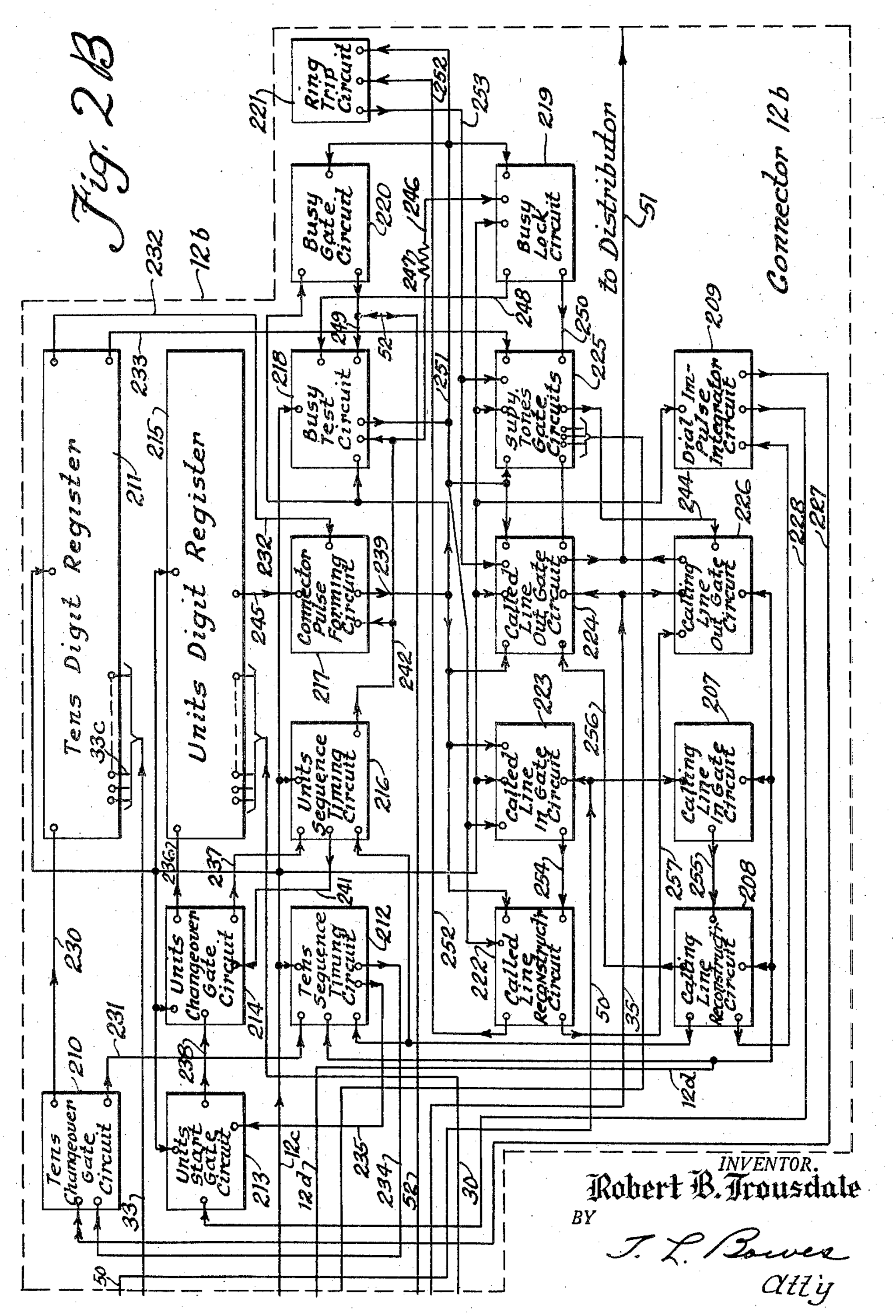
Figure 3:
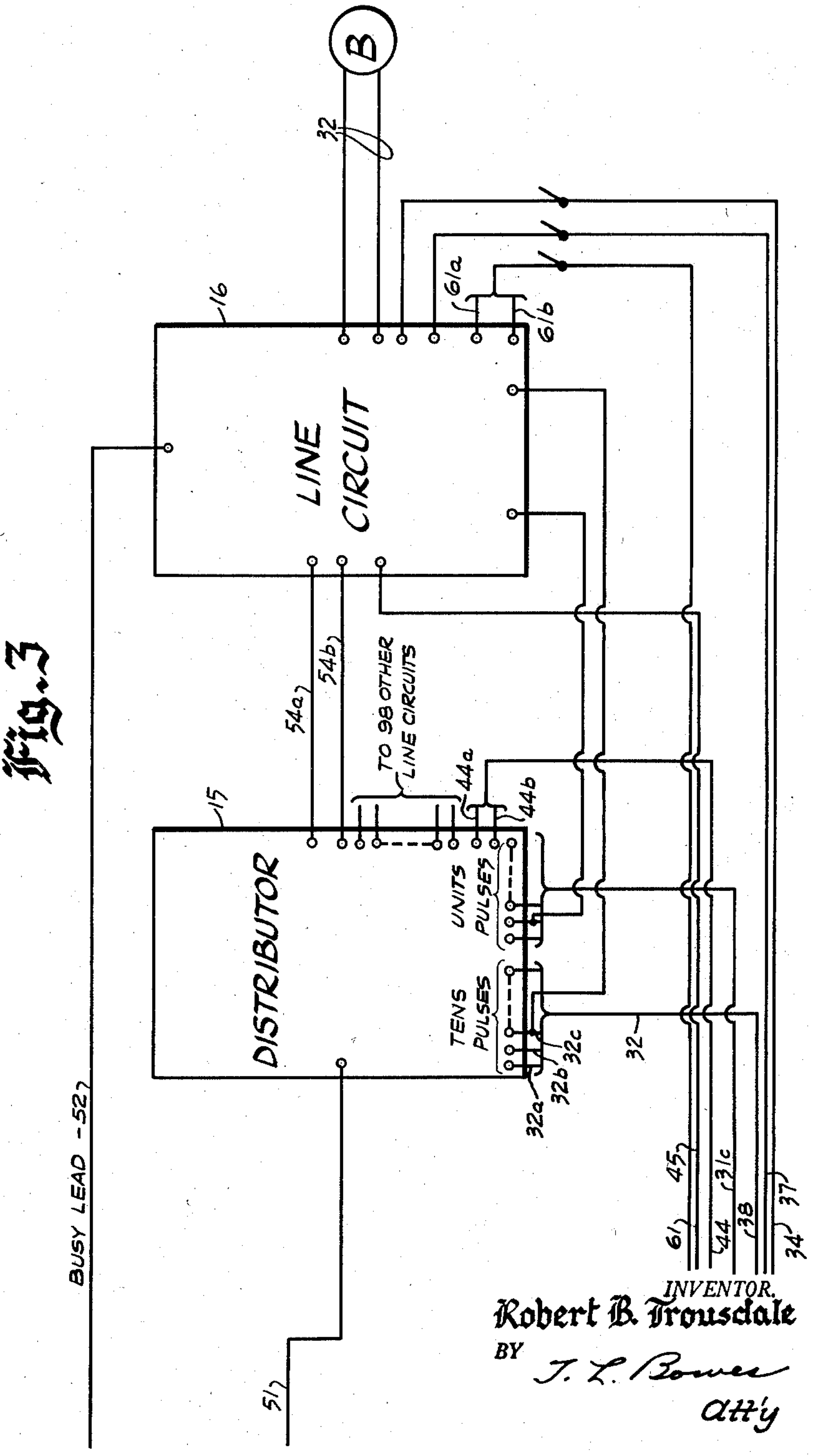
Figure 5:
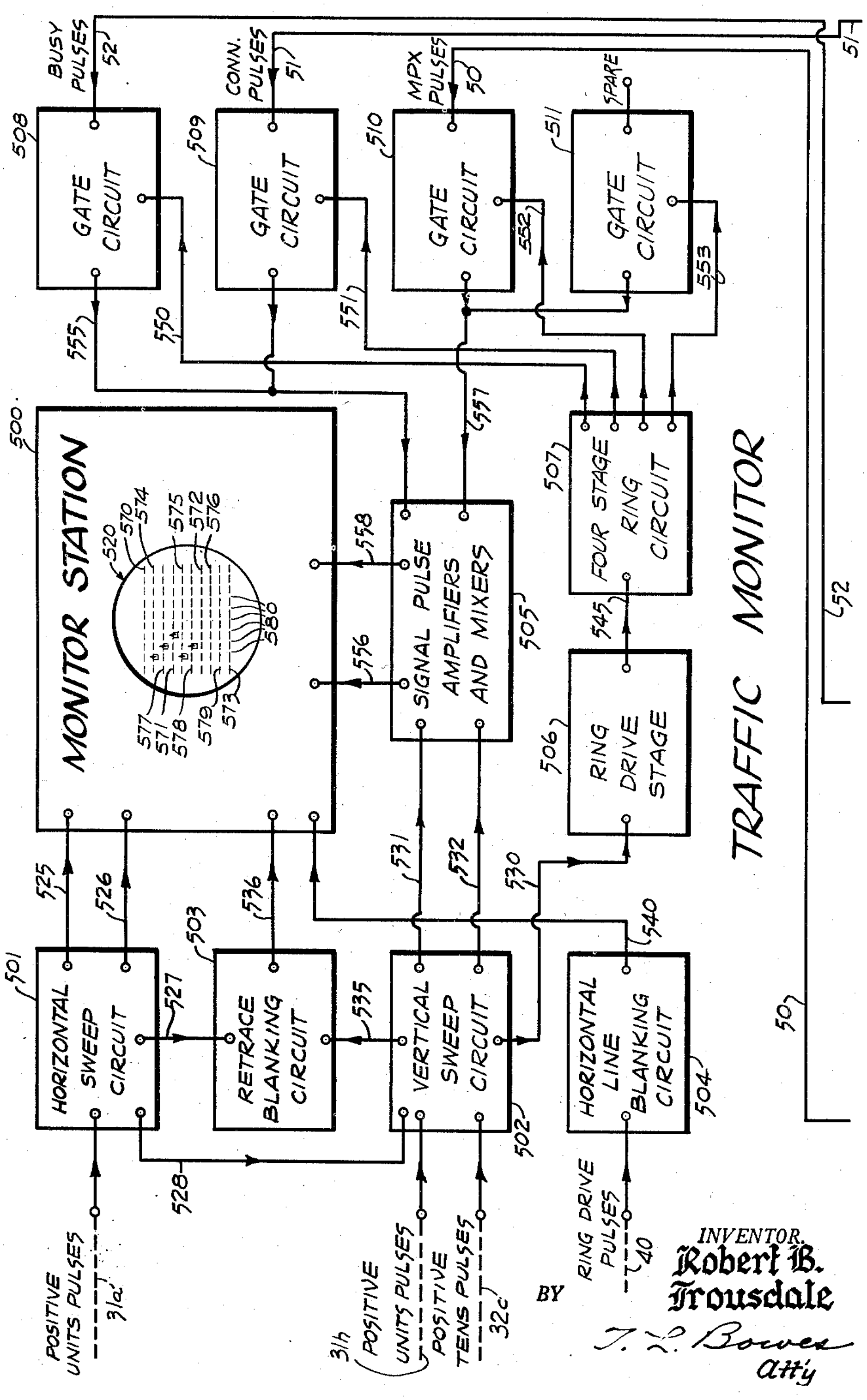
Figure 7:
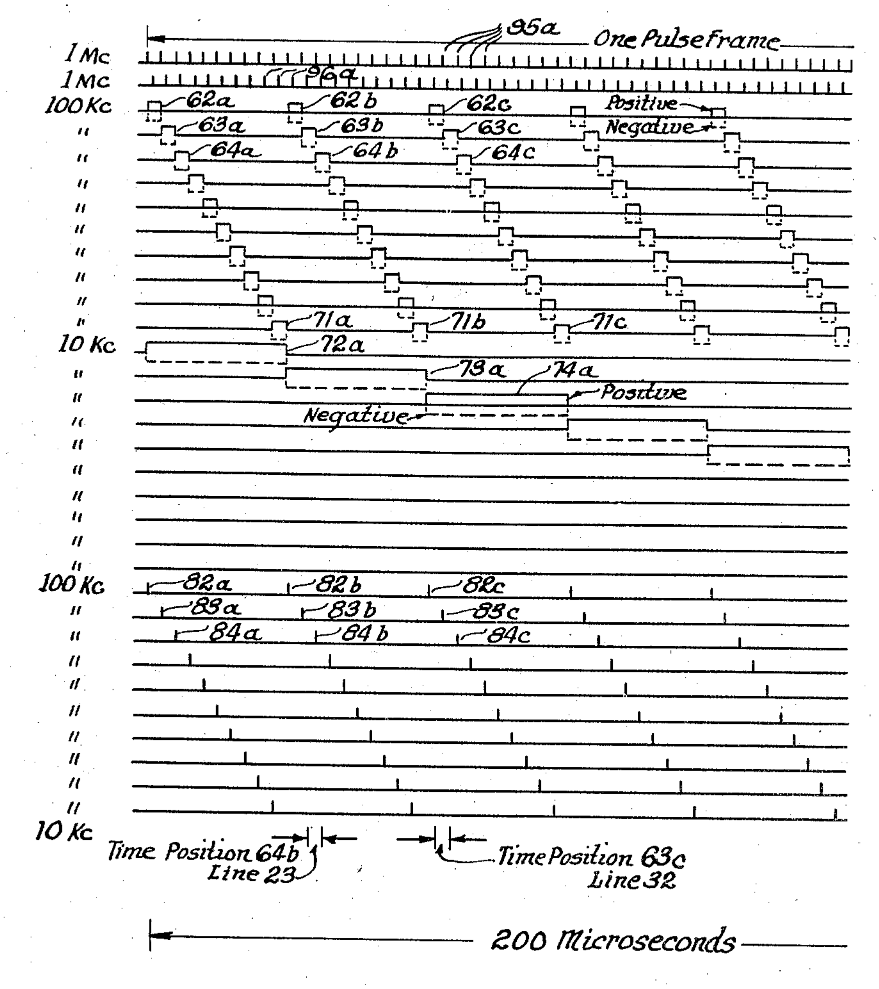
Figure 8:
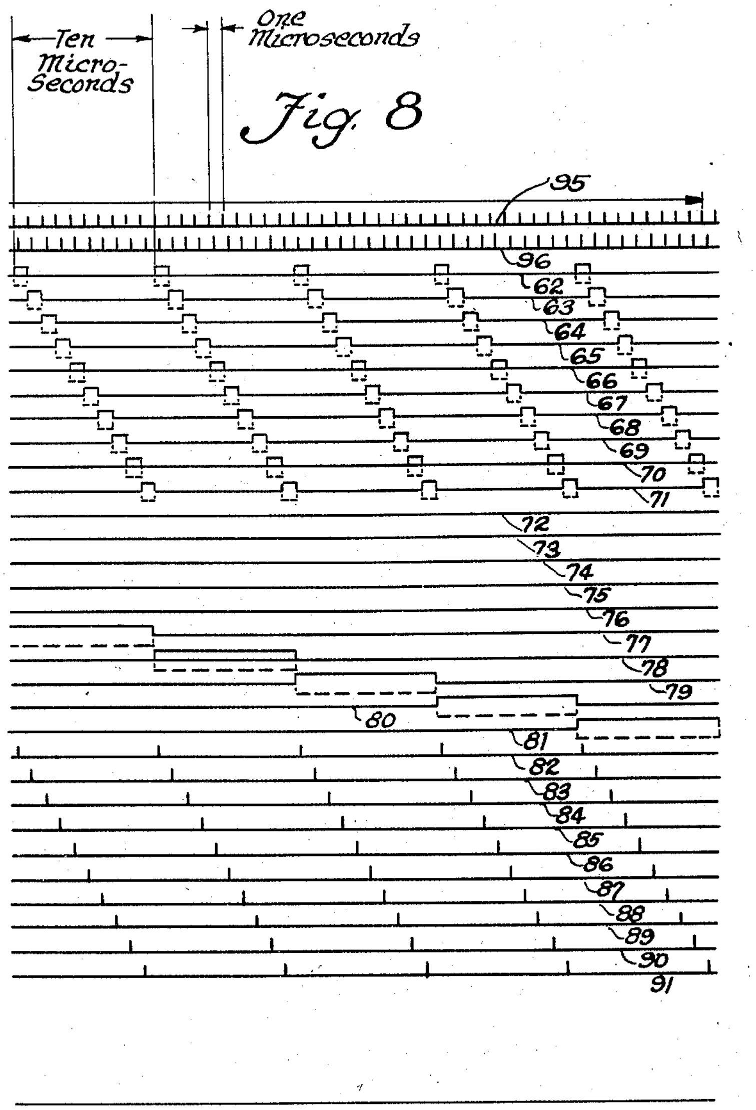
Figure 9:
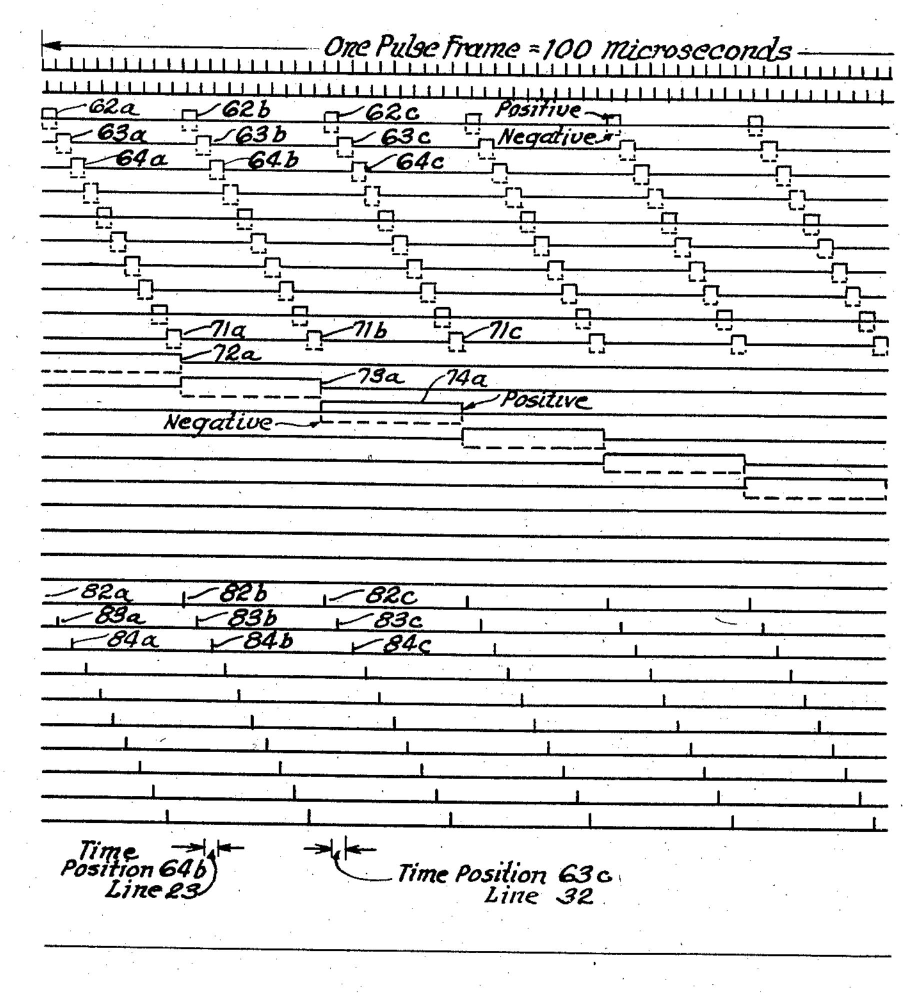
Figure 10:
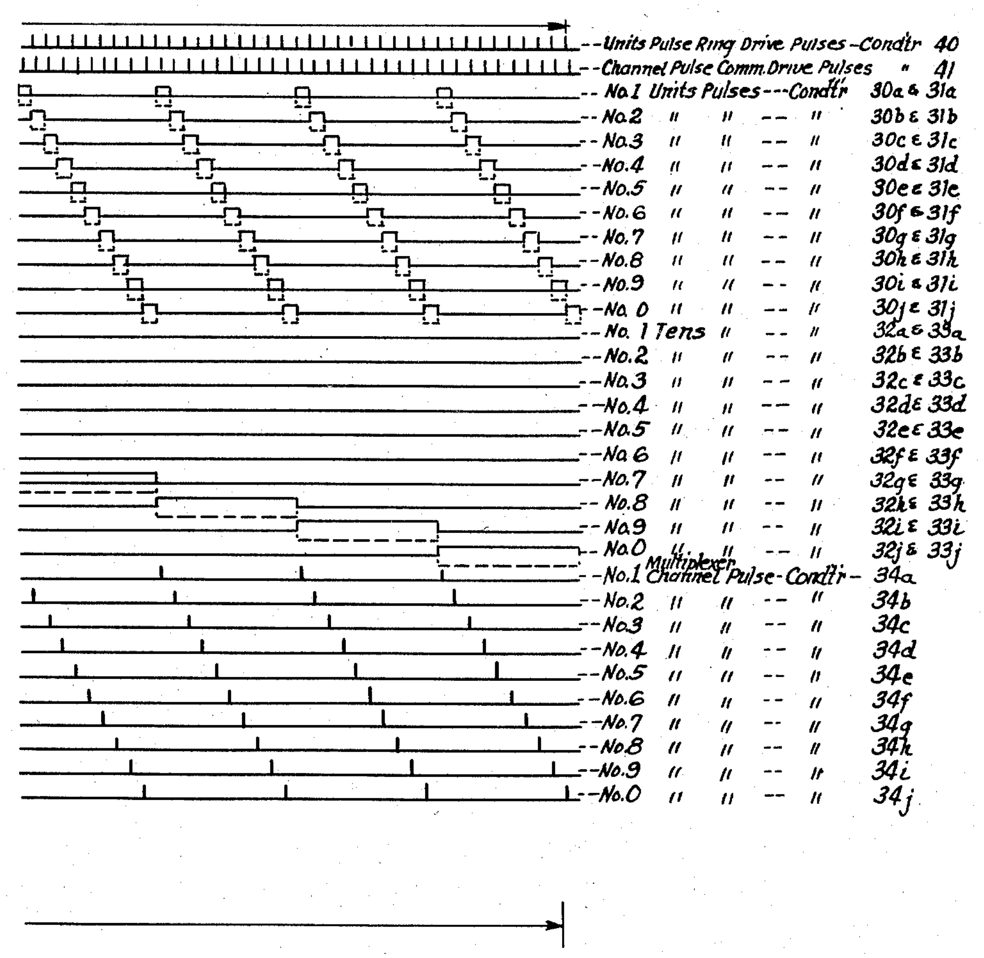
Figure 20:
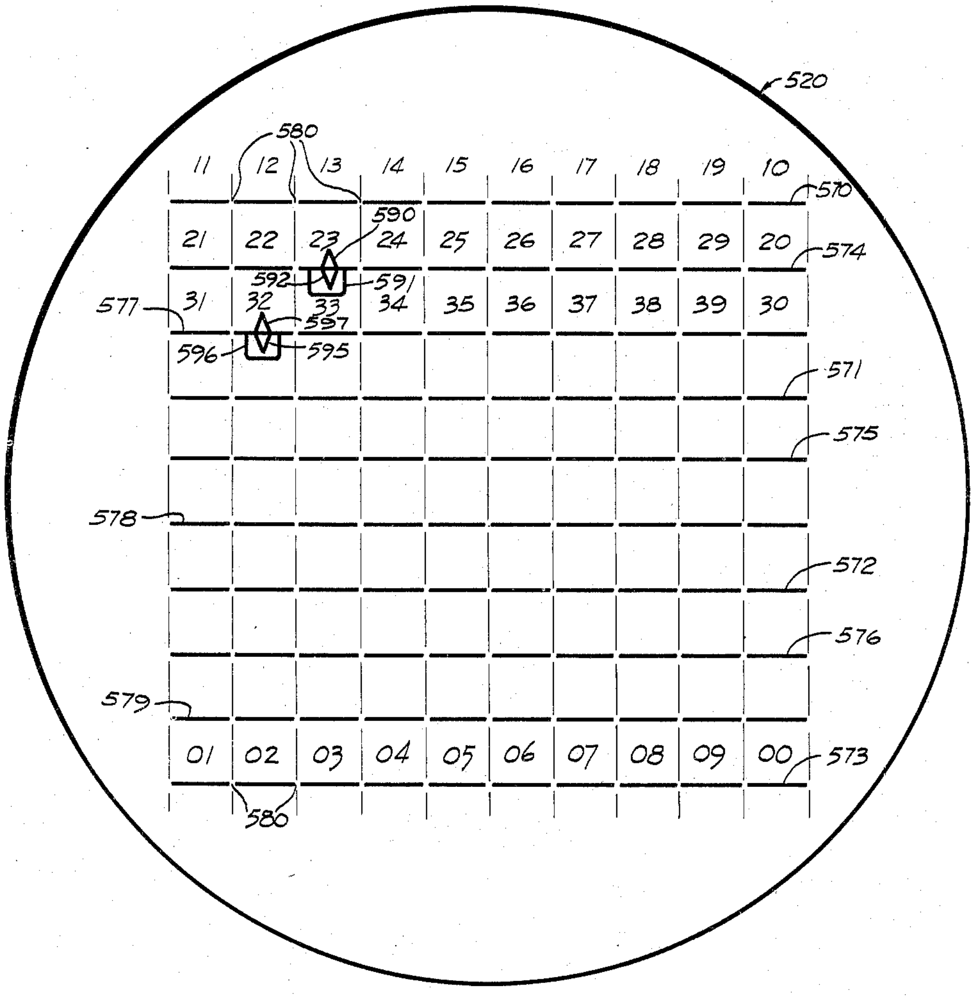
Figures 25, 26, 27, 28:
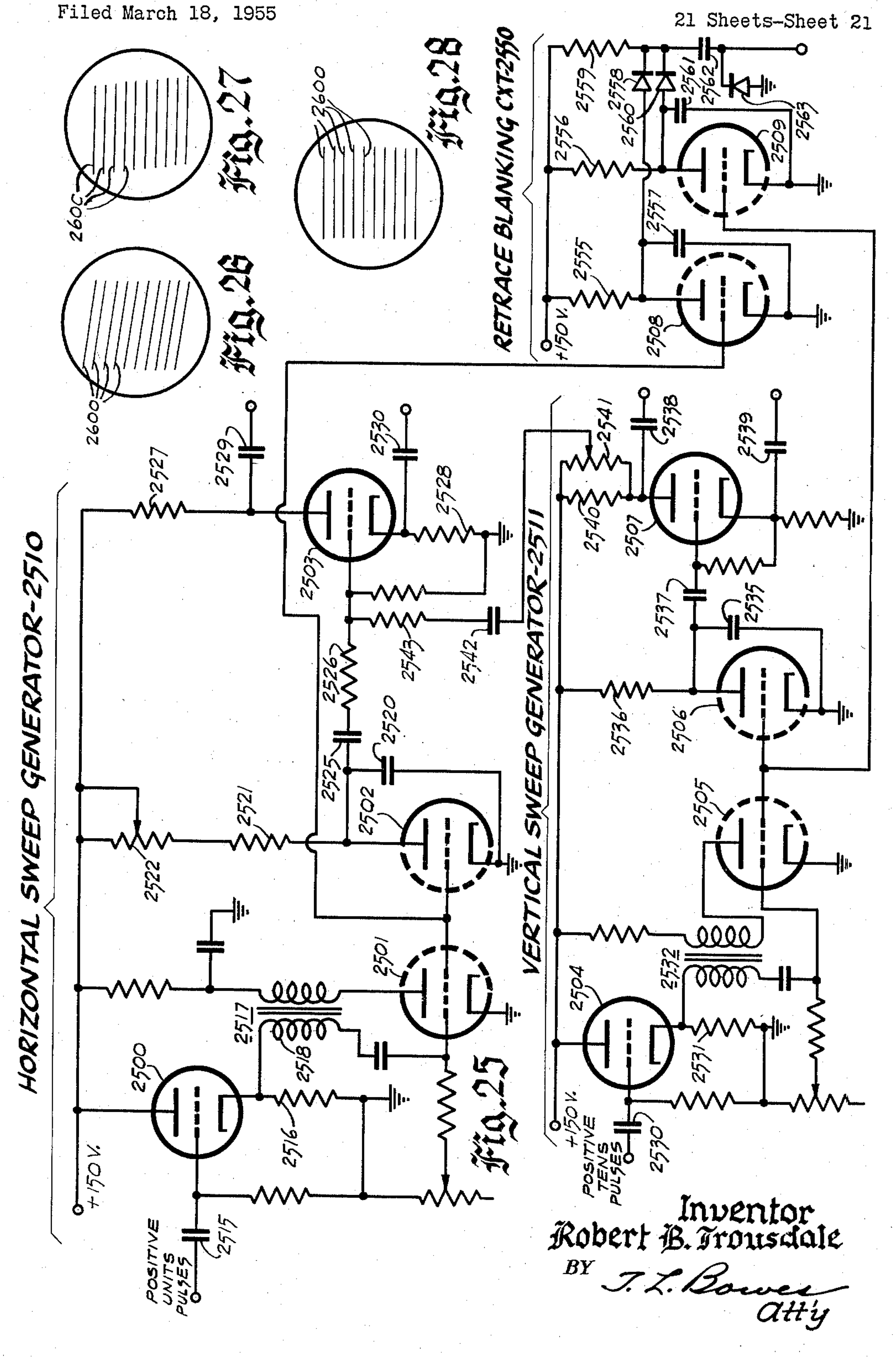

The invention, both as to its organization and method of operation, together with further objects and advantages thereof, will best be understood by reference to the following specification taken in connection with the accompanying drawings, in which:

Figs. 1, 2, 3, 4 and 5, when arranged in the manner shown in Fig. 6, diagrammatically illustrate an electronic telephone system including a traffic monitor system characterized by the features of the present invention;

Figs. 2A and 2B when laid side by side illustrate, in block diagram form, the component circuits of one of the finder-connector links of the system;

Figs. 7, 8, 9 and 10, when laid side by side in the order named, graphically illustrate the time relationships between certain of the pulses developed by and utilized in various components of the telephone system of Figs. 1 to 4, inclusive;

Figs. 11 to 19, inclusive, schematically illustrate the circuit details of the traffic monitor system shown in Fig. 5;

Fig. 20 illustrates the visual presentation of the traffic monitor system shown in Fig. 5;

Figs. 21 to 24, inclusive, when laid side by side in the order named, graphically illustrate the time relationships between certain waveforms produced in the traffic monitor system of Fig. 5;

Fig. 25 is a schematic diagram of a portion of an alternative traffic monitor system of the present invention and Figs. 26 to 28, inclusive, illustrate different visual displays which may be produced with the system of Fig. 25.

In general, the traffic monitor system of the present invention provides a visual display suitable for use with an electronic telephone system capable of serving one hundred lines. The manner in which the circuits associated with each of the lines of the system are operating is made continuously available by displaying certain waveforms indicative of the operation of these circuits on the screen of a cathode ray tube monitoring device. More specifically, a series of ten vertically displaced baselines are produced on the screen of the cathode ray tube and each baseline is divided into ten horizontally spaced sections so that the cathode ray tube screen is divided into one hundred separate and distinct areas each corresponding to one of the lines of the system. The area or section is assigned to each line in accordance with the directory number designation of the line so that each line may be readily identified. Thus, the lines 11, 12, 13–10, inclusive, in the first tens digit level of the system are assigned successive sections of the uppermost baseline on the face of the cathode ray tube the lines 21, 22, 23–20, inclusive are assigned successive sections of the second baseline, etc. The waveforms produced in various portions of the equipment in the time position assigned to each line may be simultaneous and continuously displayed on the portion of the cathode ray tube screen corresponding to the particular line so that a constant visual check on the operation of the system can be made.

Referring now to the drawings, the traffic monitor system of the present invention is shown in block diagram form in Fig. 5 thereof, in connection with an electronic telephone system of the type described in detail in the copending application Serial No. 134,974, identified above, shown in Figs. 1, 2, 3 and 4 of the present application. While the traffic monitor system of the present invention is illustrated and described in conjunction with an electronic telephone system of the type described above, it will become apparent from the following detailed description that the monitor system of the present invention may equally well be employed in other communication systems embodying pulse multiplex principles.

Figure 4:
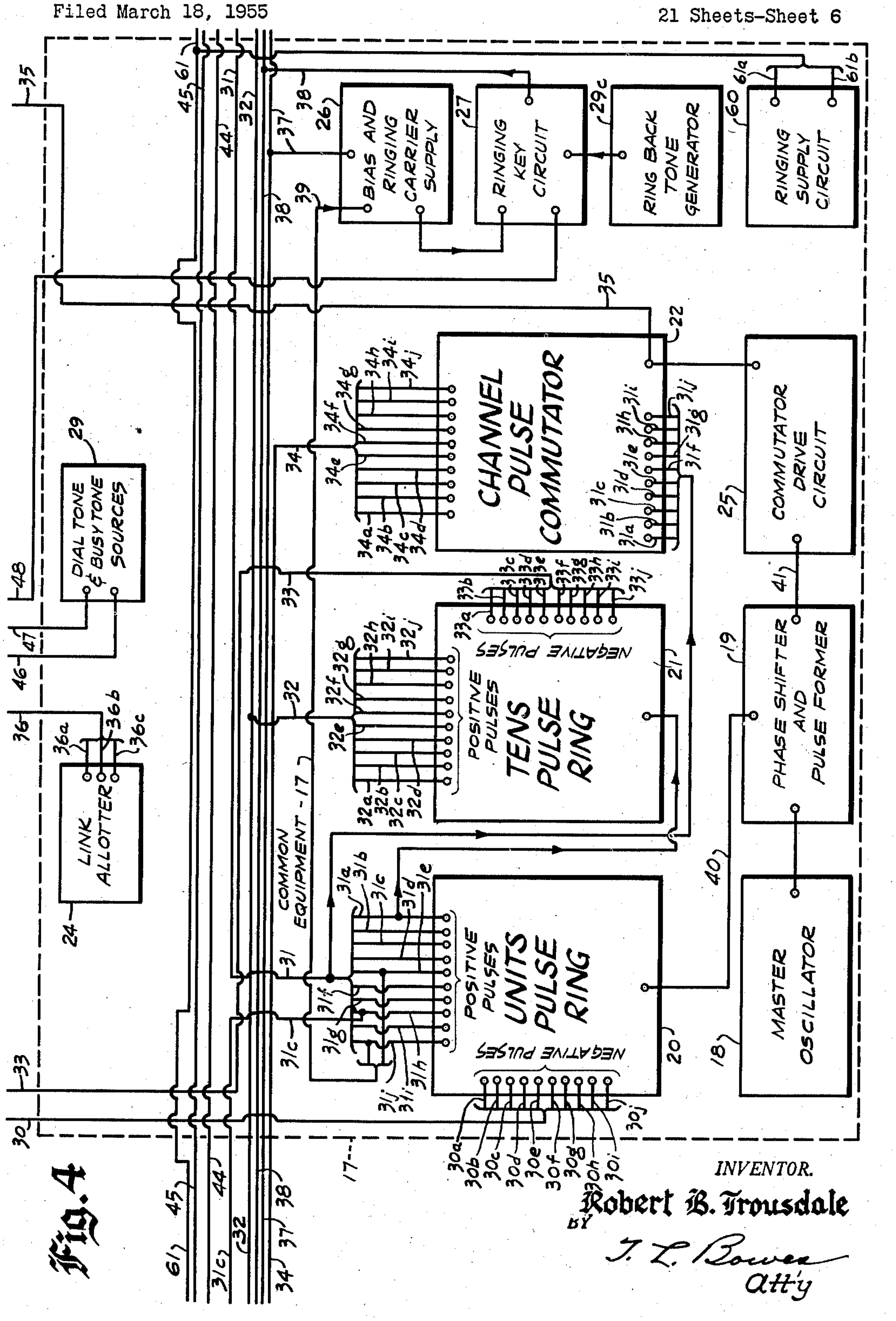

Considering first the component circuits of the electronic telephone system of Figs. 1, 2, 3 and 4 necessary to an understanding of the present invention, the fully automatic electronic telephone system is there illustrated as comprising line circuits 10, 16, etc., individual to the one hundred lines of the system, a multiplexer 11 of which only one is required in the system, a plurality of identical finder-connector links 12, 13 and 14, a distributor 15 of which only one is required in the system, and the common equipment indicated generally at 17 in Fig. 4 of the drawings. Each of the finder-connector links is comprised of a finder and a connector, the illustrated links respectively comprising finders **12*a*, 13*a* and 14*a* and connectors 12*b*, 13*b* and 14*b*. It will be understood that the number of finder-connector links employed in the system may be chosen as required to handle the traffic. Although only three links 12, 13 and 14** have been illustrated, from seven to ten links will normally be required in actual practice to handle the traffic of a one hundred line exchange. Inclusion of the additional links in the system may easily be accomplished by connecting appropriate terminals of additional links to the indicated multiple points.

As shown, the line circuits 10 and 16, respectively, terminate two two-conductor lines which are respectively identified by their directory number designations 23 and 32 and extend to the substations A and B, respectively. Each line circuit performs the functions of repeating intelligence or control signals from its associated substation to a corresponding one of the gate circuits in the multiplexer 11, repeating intelligence signals derived from a particular gate circuit of the distributor 15 to its associated substation, and of responding to ring start signals derived from one of the connectors **12*b*, 13*b* or 14*b* by way of the distributor 15 to transmit ringing current to the associated substation on a call incoming thereto. To perform these functions, the line circuit 10 is connected by way of a conductor 53 to one of the gate circuits provided in the multiplexer 11, and is connected by way of the conductors 44*a* and 44*b* forming the illustrated cable 44 to one of the gate circuits provided in the distributor 15. The line circuit 10 is also connected to certain components of the common equipment 17 in the manner described below. Similarly, the line circuit 16 is connected by way of the conductors 54*a* and 54*b* to one of the gate circuits in the distributor 15 and by way of the conductor 45 to one of the gate circuits in the multiplexer 11. This line circuit is also connected to certain components of the common equipment 17 in the manner pointed out below. The other ninety-eight line circuits of the system are likewise connected on an individual basis to corresponding gate circuits of the multiplexer 11 and distributor 15 and on a common basis to certain components of the common equipment 17**.

Generally speaking, the multiplexer 11 performs the functions of sampling the intelligence and control signals derived from the one hundred line circuits of the system only in the pulse time positions of each pulse frame individually assigned to the lines served by these line circuits, and of modulating the sampled intelligence or control signals on the multiplexer signal pulses occurring in these pulse time positions for transmission to the finders and connectors of the plurality of links 12, 13 and 14. To this end, the output terminals of the multiplexer 11 are connected by way of the common conductor 50 to the multiplexer input terminals of each of the finders **12*a*, 13*a* and 14*a* and also to the multiplexer input terminals of each of the connectors 12*b*, 13*b* and 14*b*. In reverse manner, the distributor 15 performs the function of repeating intelligence and control signals derived from the connectors 12*b*, 13*b* and 14*b* in pulse time positions corresponding to particular calling and called lines to the line circuits respectively terminating the lines. To this end, the input terminals of the distributor are connected by way of the common conductor 51 to the output terminals of each of the connectors 12*b*, 13*b* and 14*b*. In performing the described functions, the multiplexer 11 and the distributor 15 are controlled by certain components of the common equipment 17** in the manner hereinafter explained.

The finders of the various links, such, for example, as the finder **12*a*, do not perform any intelligence transmission functions. On the contrary, they function strictly as control units. Specifically, the finder 12*a* is provided to perform the function of determining when the link 12 shall be taken into use, determining the calling line with which the link is to be associated in handling a call, and determining the particular pulse time position of successive pulse frames which is assigned to the calling line and during which signal bearing pulses derived from the multiplexer 11 shall be effective to produce a response in the finder and the associated connector 12*b*. To advise the connector of the pulse time position assigned to the calling line, the finder 12*a* transmits finder gate pulses to the connector in this pulse time position over the conductor 12*d*. The finder 12*a* also performs the function of conditioning its associated connector 12*b* for operation when the link 12 is definitely associated with a calling line to handle the call initiated on the line. This is accomplished through operation of the finder 12*a* to impress operating anode potentials upon a plurality of the tubes in the connector 12*b* over the +B switch conductor 12*c*. When operatively associated with a particular calling line, the finder 12*a* also performs the function of guarding the calling line against intrusion on an incoming call to the line. This is accomplished through operation of the finder 12*a* to feed busy pulses occurring in the particular pulse time position assigned to the calling line with which the finder is operatively associated to a common busy conductor 52 which is multipled to each of the finders and connectors of the system. To perform the above functions in the manner fully explained below, the finder 12*a* comprises (see Fig. 2A) a pulse input circuit 200, a +B switching circuit 201, a pulse combining circuit 202, tens and units coincidence tube circuits 203 and 204, and a finder pulse forming circuit 205. It will be noted that the finder 12*a* and connector 12*b*** are connected on an individual link basis by only two conductors, namely the +B switch conductor 12c and the finder gate pulse conductor 12d. The finder 13a and connector 13b of the link 13 are similarly connected on an individual link basis by means of the finder gate and +B switch conductors 13d and 13c which respectively correspond to the conductors 12d and 12c of the link 12. Similarly, the finder gate and +B switch conductors 14d and 14c are provided to connect the finder 14a and connector 14b of the link 14.

Each of the connectors 12b, 13b and 14b performs a plurality of different functions. Thus, the connector 12b, for example, is controlled by finder gate pulses delivered thereto over the conductor 12d to accept and respond to signal bearing multiplexer pulses occurring in the pulse time position corresponding to the calling line with which the link is associated. It also responds to the application of operating anode potential to the conductor 12c and to the finder gate pulses appearing on the conductor 12d to feed a dial tone signal to the distributor 15 on connector signal pulses occurring in the pulse time position assigned to the calling line with which it is operatively associated, thereby to return the usual dial tone signal to the calling subscriber. This connector 12b also responds to dial pulses (two digits) originating at the calling line with which the link 12 is operatively associated to select the particular pulse time position assigned to the called line. Incident to the selection of this time position, the connector 12b conditions itself to accept signal carrying pulses from the multiplexer 11 which occur in the pulse time position corresponding to the selected called line, to store the intelligence carried by these pulses, and to retransmit the intelligence to the distributor 15 on connector signal pulses occurring in the pulse time position corresponding to the calling line with which the link 12 is operatively associated. In effect, therefore, the connector functions to shift signal carrying pulses from the pulse time position assigned to the calling line to the pulse time position assigned to the called line, and also to shift return signal pulses carrying intelligence derived from the called line from the particular pulse time position assigned to the called line to the particular pulse time position corresponding to the calling line. In addition, the connector 12b performs the auxiliary functions of terminating dial tone transmission to the calling substation when the first line selecting impulse is dialed into the connector; feeding busy pulses to the busy conductor 52 in the pulse time position assigned to the called line, thereby to guard the called line against seizure through another link; testing the pulse time position assigned to the called line to determine the idle or busy condition of that line; transmitting busy tone carrying pulses to the distributor 15 in the pulse time position assigned to the calling line in the event the called line tests busy; transmitting a ring start signal by way of the distributor 15 to the line circuit terminating the called line in the event the called line tests idle, concurrently transmitting ring-back tone modulated pulses to the distributor 15 in the pulse time position assigned to the calling line, thereby to signal the calling subscriber that the called substation is being rung; and terminating the ring start signal and concurrently terminating ring-back tone signal transmission to the calling substation in response to answering of the call at the called substation. The connector 12b is also arranged to release in response to the release of a connection involving the link 12 at the calling substation.

To perform the above-mentioned functions in the manner fully explained in the copending application Serial No. 134,974, identified above, the connector 12b, as diagrammatically illustrated in Fig. 2B, is provided with a calling line in gate circuit 207 which responds to finder gate pulses transmitted to the connector over the conductor 12d to repeat signal bearing pulses delivered thereto from the multiplexer 11 in the pulse time position assigned to the calling line, and a calling line reconstructor circuit 208 having the function of detecting or reconstructing and storing the intelligence carried by the signal bearing pulses transmitted to the connector from the multiplexer 11 in the pulse time position assigned to the calling line. The connector 12b further comprises a called line out gate circuit 224 for gating to the distributor 15 connector signal pulses carrying the intelligence reconstructed by the circuit 208 in the time position assigned to a particular called line. In addition, the connector 12b includes a called line in gate circuit 223 for repeating multiplexer pulses in the pulse time position assigned to the called line which bear intelligence or control signals derived from the called line, a called line reconstructor circuit 222 for detecting or reconstructing the intelligence or control signals gated by the called line in gate circuit 223, and a calling line out gate circuit 226 which is controlled in accordance with the detected intelligence stored in the circuit 222 and by the finder gate pulses delivered to the connector over the conductor 12d to gate the distributor 15 signal bearing connector pulses which occur in the pulse time position assigned to the calling line. More generally, the three circuits 207, 208 and 224 function to repeat intelligence from the calling line to the called line, whereas the three corresponding circuits 223, 222 and 226 function to repeat to the calling line intelligence derived from the called line.

The connector 12b additionally comprises a plurality of components for responding to two digits of dial pulses repeated to the connector on multiplexer pulses occurring in the pulse time position assigned to the calling line. In general, the dial pulse responsive equipment of the connector 12b comprises a dial impulse integrator circuit 209 which receives dial impulses from the reconstructor circuit 208, a tens changeover gate circuit 210, a units start gate circuit 213 to which pulses are repeated by the dial pulse integrator circuit 209, tens and units digit registers 211 and 215 which are respectively controlled in accordance with the numerical values of the tens and units digits repeated to the circuits 210 and 213 from the integrator circuit 209, a units changeover gate circuit 214 interposed between the start gate circuit 213 and the units digit register 215, and tens and units sequence timing circuits 212 and 216 which in effect function as the digit counting components of the connector, i. e., initiate certain operations at the ends of the first and second digits dialed into the connector. The connector further comprises a connector pulse forming circuit 217 which is controlled in accordance with the settings imparted to the tens and units digit registers 211 and 215 at the end of a dialing operation to produce the connector pulses which are employed to control the circuits 222, 223 and 224 in the transmission of intelligence and control signal information from the connector to the distributor 15 in the pulse time position assigned to the called line. The busy test facilities of the connector comprise a busy test circuit 218 jointly controlled by the connector pulse forming circuit 217 and busy pulses transmitted to the connector over the common busy lead 52, a busy lock circuit 219 and a busy gate circuit 220. In addition, the connector comprises supervisory tone gate circuits 225 having the function of gating dial, busy and ring-back tones to the calling line. Finally, the connector comprises a ring trip circuit 221 which is assigned the function of terminating ringing current transmission to a called substation when a call answering operation is performed at the substation.

Generally considered, the common equipment 17 comprises a master oscillator 18 designed to operate at a fixed radio frequency (preferably one megacycle) and having its output terminals connected to control a phase shifter and pulse former network 19. If desired or necessary, the master oscillator 18 may be common to a plurality of exchanges, in which case it is connected to feed its output signal to the several exchanges over coaxial cables. As controlled by the master oscillator 18, the phase shifter and pulse former network 19 functions continuously to develop two identical trains of shaped pulses having a common pulse frequency of one megacycle, which are transmitted over the channels 40 and 41, respectively, to a units pulse ring circuit 20 and a commutator drive circuit 25. The phase relationship between the pulses respectively produced in the channels 40 and 41 by the network 19 may be shifted as desired through adjustment of certain of the components of this network in the manner more fully explained below. As controlled by the phase shifter and pulse former network 19, the units pulse ring circuit 20 functions sequentially to develop the units pulses which define the pulse time positions of the pulse frames, appear on the conductors within the cables 31 and 30, respectively, and are fed by way of these conductors to the various intelligence transmitting and control components of the system. More specifically, the cable 30 comprises ten units pulse conductors *30a* *30b–30j* over which negative units pulses are sequentially transmitted in the order named to the units coincidence tube circuits of the finders 12*a*, 13*a* and 14*a* and the units digits registers of the connectors 12*b*, 13*b* and 14*b*. In time coincidence with the described negative units pulses, the ring circuit 20 produces positive units pulses on the ten units pulse conductors 31*a*, 31*b*–31*j* forming the cable 31, which are transmitted to the units gate circuits of the distributor 15 and also to the pulse gate circuits of a channel pulse commutator 22. The positive units pulses developed upon the two conductors *31a* and *31f* are also employed to control a bias and ringing carrier supply circuit 26. The positive and negative units pulses are sequentially developed on the units leads 31 and 30, respectively, at a frequency rate of 100 kilocycles and each tenth positive units pulse, i. e., each pulse appearing on the units pulse conductor 31*j*, is used to step or trigger a tens pulse ring circuit 21 having the function of developing the positive and negative tens pulses, each of which spans the time interval of ten units pulses. The positive tens pulses as sequentially produced by the ring circuit 21 on the tens pulse conductors *32a*, *32b–32j* forming the cable 32 are impressed upon the tens pulse gate circuits of the multiplexer 11 and the tens pulse gate circuits of the distributor 15 in the manner more fully explained below. The negative tens pulses as produced by the ring circuit 21 in time coincidence with the positive tens pulses and as sequentially impressed on the tens pulse conductors *33a*, *33b–33j* forming the cable 33 are impressed on the tens coincidence tube circuits 203 of the finders 12*a*, 12*b*, and 12*c* and the tens digit registers 211 embodied in the connectors 12*b*, 13*b* and 14*b*, all in the manner more fully explained below. As controlled by the positive units pulses derived from the units pulse ring circuit 20 and the commutator drive pulses derived from the commutator drive circuit 25, the channel pulse commutator 22 functions successively to develop very narrow channel pulses on the channel pulse conductors *34a*, *34b–34j* forming the cable 34, which are fed to the units pulse gate circuits of the multiplexer 11. These channel pulses occur at the same frequency as the units pulses, but are much narrower in width. For example, the channel pulses appearing on the conductor *34a* are much narrower than the units pulses appearing on the positive units pulse lead 31*a* and are preferably so phased relative to the units pulses that each channel pulse occurs well within the limits of the coincident positive units pulse. Commutator drive pulses as derived from the commutator drive circuit 25 are also transmitted directly over a commutator drive pulse conductor 35 to the out gate circuits 224 and 226 of each of the connectors 12*b*, 13*b* and 14*b*.

The common equipment 17 further comprises a link allotter 24 having the function of developing link allotting pulses of relatively long duration (preferably each pulse persists for at least one millisecond) successively on the link allotting conductors 36*a*, 36*b* and 36*c*. These conductors individually extend to the pulse combining circuits of the finders 12*a*, 13*a* and 14*a* and the pulses impressed thereon perform the function of rendering the respective corresponding links available for use providing the links are not already occupied with calls.

As indicated above, the line circuits 10, 16, etc., individually terminating the lines of the system, perform the function of transmitting ringing current to their respective associated substations. Keyed ringing current transmission from any line circuit terminating a called idle line is effected at a predetermined slow rate of the order of one second on and four seconds off, under the control of the bias and ringing carrier supply circuit 26 and a keying circuit 27 which are embodied in the common equipment 17 and are connected to each of the line circuits 10, 16, etc., over common multiple conductors 37 and 38. The common equipment also includes dial tone and busy tone sources which are collectively indicated at 29 in Fig. 4 of the drawings and are respectively connected by way of the multiple conductors 46 and 47 to the supervisory tone gate circuits of each of the connectors 12*b*, 13*b* and 14*b*. The common equipment further comprises a ring-back tone generator 29*c*, the output signal of which is keyed by the ringing keying circuit 27 and supplied to the supervisory tone gate circuits of each of the connectors 12*b*, 13*b* and 14*b* over a common multiple conductor 48. Finally, the common equipment includes a ringing supply circuit 60 which embodies a 20 cycle ringing current source and which is connected by way of two common multiple conductors 61*a* and 61*b* within the cable 61 to each of the line circuits of the system.

In order to render the mode of operation of the system more readily understandable, a pulse chart has been illustrated in Figs. 7 to 10, inclusive, to show the relative widths of the pulses developed by the common equipment components 19, 25, 20, 21 and 22 during two successive pulse frames, as well as the time or phase relationship between the pulses. As there shown, the units pulse ring drive pulses *95a*, appearing on the conductor 40, are produced by the phase shifter and pulse former circuit 19 along the zero potential reference line 95 at a frequency rate of one megacycle and are of the positive polarity. Similarly, the channel pulse commutator drive pulses 96*a* appearing on the conductors 41 and 35 are produced by the phase shifter and pulse former network 19 along the zero potential reference line 96 at the same frequency of one megacycle and are of positive polarity. It will be noted that both the units pulse ring drive pulses 95*a* and the commutator drive pulses 96*a* are very narrow, i. e., persist for very short time intervals, and that the pulses 96*a* are so displaced in time relative to the pulses *95a* that each commutator drive pulse 96*a* occurs approximately at the middle of the period separating the preceding and succeeding units pulse ring drive pulses *95a*. The positive units pulses appearing respectively on the units pulse conductors 31*b*, 31*c*–31*j* and the negative units pulses coincidentally appearing on the units pulse conductors *31a*, 31*b*–31*j* are produced along the zero potential reference lines 62, 63–71. More specifically, the positive units pulses produced along these potential reference lines and appearing on the units pulse conductors 31 are shown in solid lines, whereas the coincident negative units pulses produced along the same reference lines and appearing on the units pulse conductors 30 are shown in dash lines. It will be noted that the units pulses are produced by the units pulse ring circuit 20 at the fundamental frequency rate of one megacycle. However, due to diversion of the pulses successively to different ones of the units pulse conductors *a*, *b–j*, the pulses along any particular zero potential reference line, such, for example, as the line 62, recur only at a frequency rate of one hundred kilocycles. It will also be noted that the units pulses, both positive and negative, are successively produced on the units pulse conductors 30 and 31 in the order of alphabetical designation of these conductors. Thus, successive positive and coincident negative units pulses produced along any particular zero potential reference line, as, for example, those occurring during the units pulse periods 62*a*, 62*b*, 62*c*, etc., along the potential reference line 62, are separated by a time interval equaling the sum of nine units pulse time positions and during which units pulses are produced successively along each of the nine other zero potential reference lines.

The negative tens pulses successively produced by the tens pulse ring circuit 21 on the tens pulse conductors 33*a*, 33*b*–33*j* and the positive tens pulses coincidentally produced on the tens pulse conductors 32*a*, 32*b*–32*j* are illustrated as appearing along the ten zero potential reference lines 72 to 81, inclusive. Here also, the positive tens pulses are shown in solid lines, whereas the coincidentally produced negative tens pulses are shown in dash lines. It will be noted that each tens pulse persists for a time interval exactly equaling the time required to produce ten units pulses. Thus, the positive and negative tens pulse 72*a* persists for the duration of the interval in which the ten units pulses 62*a*–71*a* are successively produced by the units pulse ring circuit 20. It will also be noted that the starting point of each tens pulse period 72*a*, 73*a*, 74*a*, etc., is exactly coincident with the starting points of the positive and negative units pulses 62*a*, 62*b*, 62*c*, etc., appearing along the zero potential reference line 62 and impressed upon the units pulse conductors 30*a* and 31*a*, respectively, by the units pulse ring circuit 20. Further, each tens pulse period terminates at the exact instant of termination of the positive and negative units pulses 71*a*, 71*b*, 71*c*, etc., appearing along the zero potential reference line 72 and produced by the units pulse ring circuit 20 on the conductors 30*j* and 31*j*, respectively. The described synchronism between the time positions of the tens pulses and the time positions of the units pulses successively produced on the units pulse conductors by the ring circuit 20 is obtained and maintained by employing the trailing edges of the positive units pulses appearing on the last positive units pulse conductor 31*j* to step or trigger the tens pulse ring 21 on a periodic basis.

The channel pulses which are successively produced on the ten channel pulse conductors 34*a*, 34*b*–34*j* by the channel pulse commutator 22 and are transmitted to the multiplexer 11 for signal bearing purposes in the manner indicated above, are of positive polarity, are produced along the zero potential reference lines 82 to 91, inclusive, and occur in time coincidence with the commutator drive pulses 96*a* appearing along the zero potential reference line 96. Like the positive and negative units pulses, the channel pulses are produced at the fundamental frequency rate of one megacycle, but due to the action of the commutator 22 in diverting these pulses successively to the conductors 34*a*, 34*b*–34*j* recur only on each of these conductors at a rate of one hundred kilocycles. Thus, the channel pulses 82*a*, 82*b*, 82*c*, etc., appearing along the reference line 82 and impressed on the conductor 34*a* are spaced apart timewise by like intervals each of which exactly equals the sum of ten units pulse time periods. During this spacing interval, nine additional channel pulses are successively produced along the reference lines 83, 84–91 to appear on the conductors 34*b*, 34*c*–34*j*. It will also be noted that the channel pulses are very narrow in width, having a persistence interval of the order of one-fifth the persistence interval of the units pulse time period. Moreover, each channel pulse occurs well within the limits and preferably within the first half of each units pulse. This is accomplished by utilizing the channel pulse commutator drive pulses developed on the conductor 35 and appearing along the zero potential reference line 96, which are displaced timewise relative to the units pulse ring drive pulses 95*a*, to open the gating circuits of the channel pulse commutator 22 in the manner more fully explained below. The purpose of thus positioning the signal bearing pulses in the units pulse time positions is that of insuring transmission of these pulses through the units gate circuits of the signal handling components of the system while these gate circuits are open despite slight variations in relative positions of the units pulses and the signal bearing pulses occasioned by circuit delays.

With the above general description of the pulse chart illustrated in Figs. 7 to 10, inclusive, in mind, it will readily be understood that each pulse frame is divided into one hundred readily identifiable pulse time positions. Thus, the first ten pulse time positions of each pulse frame, which are respectively assigned to the lines of the system having the directory number designations 11, 12–10, are defined by the first tens pulse period 72*a* of the frame within which the ten units pulse periods 62*a*, 63*a*, 64*a*–71*a* occur. Similarly, the second ten pulse time positions, which are respectively assigned to the lines of the system having the directory number designations 21, 22, 23–20, are defined by the second tens pulse period 73*a* during which the ten units pulse periods 62*b*, 63*b*, 64*b*–71*b* occur. Again, the third ten pulse time positions, which are respectively assigned to the lines of the system having the directory number designations, 31, 32, 33–30, are marked out by the third tens pulse time period 7 during which the ten units pulse periods 62*c*, 63*c*, 64*c*–71*c* occur. Thus, it will be understood that the pulse time position of each pulse frame which is assigned to the illustrated line 23 occurs during the second tens pulse interval 73*a* of each pulse frame and is coincident with the units pulse period 64*b* of each pulse frame. It will also be apparent that the corresponding signal pulse 84*b* occurs well within the limits of this pulse time position. Similarly, the pulse time position 32 assigned to the illustrated line 32 occurs during the third tens pulse time interval 74*a* of each pulse frame and is coincident with the second units pulse period 63*c* of each pulse frame. Here again, each channel pulse 83*c* corresponding to the line 32 occurs well within the limits of the particular pulse time position assigned to the line 32 in each pulse frame.

Considering now the component units of the traffic monitor system of the present invention in relation to the electronic telephone system described generally above, the monitor system is shown in Fig. 5 as comprising a monitor station 500, a horizontal sweep circuit 501, a vertical sweep circuit 502, a retrace blanking circuit 503, a horizontal line blanking circuit 504, signal pulse amplifiers and mixers 505, a ring drive stage 506, a four stage ring circuit 507 and a plurality of gate circuits 508, 509, 510 and 511.

Considered generally, the monitor station 500 includes a cathode ray tube 520 and performs the function of displaying on the screen of the cathode ray tube 520 waveforms which are supplied thereto from certain portions of the electronic telephone system of Figs. 1, 2, 3 and 4. The horizontal sweep circuit 501 performs the function of sweeping the beam of the cathode ray tube 520 horizontally across the screen of the cathode ray tube under the control of certain ones of the units pulses produced by the units pulse ring circuit 20 (Fig. 4) and at a rate such that the beam travels across the screen of the tube 520 during the time interval between these pulses, i. e., the time interval which exactly spans the ten pulse time positions individually assigned to the lines of a particular subgroup.

In order to allow time for the beam to be returned to its initial position at the end of each horizontal sweep period, all of the time positions in a pulse frame are not successively scanned but instead the time positions are scanned by groups of ten, with intervening intervals equal to twenty time positions, i. e., two groups of ten time positions, being allowed for the horizontal retrace.

Thus, the time positions assigned to the lines 11, 12, 13–10, inclusive, are successively scanned after which the beam is returned to its initial position and the time positions assigned to the lines 41, 42, 43–40, inclusive, are then scanned. The beam is again returned to its initial position during the next twenty time positions and the time positions assigned to the lines 71, 72, 73–70, inclusive, are thereafter successively scanned. Accordingly, the scanning rate of the horizontal sweep circuit 501 is one-third that of the tens pulses produced by the tens pulse ring 21 and only the portion of each horizontal sweep wave form corresponding to ten pulse time positions is utilized. The lines of the system are, therefore, scanned in staggered relation in the following manner; 11, 12, 13–10, inclusive, 41, 42, 43–40, inclusive, 71, 72, 73–70, inclusive, 01, 02, 03–00, inclusive, 21, 22, 23–20, inclusive, 51, 52, 53–50, inclusive, 81, 82, 83–80, inclusive, 31, 32–33–30 inclusive, 61, 62, 63–60, inclusive, and 91, 92, 93–90, inclusive. The horizontal sweep circuit 501 also performs the function of supplying a control signal to the vertical sweep circuit 501 to control the retrace period thereof, and the circuit 501 also supplies a blanking pulse to the retrace blanking circuit 503. To perform the above described functions, the horizontal sweep circuit 501 is connected to the units pulse ring circuit 20 over the conductor **31*a*, to the cathode ray tube 520 over the conductors 525 and 526, to the retrace blanking circuit 503 over the conductor 527 and to the vertical sweep circuit 502 over the conductor 528**.

The vertical sweep circuit 502 performs the function of moving the beam of the cathode ray tube 520 in the vertical direction in predetermined relationship to the horizontal beam deflections produced by the horizontal sweep circuit 501 and in a stepped or staircase fashion such that 10 separate, vertically spaced lines or traces, corresponding to the individual ten line subgroups of the 100 line telephone system are produced on the face of the cathode ray tube 520. Since the time period equal to 20 time positions is allotted for the retrace of each horizontal deflection, the stepped wave form developed by the vertical sweep circuit 502 must be correlated with the horizontal scanning wave form so that the horizontal lines produced on the face of the cathode ray tube 520 occur in the order corresponding to the respective lines in the original pulse frame. Thus, during the period when the lines 11, 12, 13–10, inclusive, are being scanned, the vertical sweep wave form has a value such that the horizontal line produced during this interval is positioned at the top of the cathode ray tube screen as indicated by the base line 570 in Fig. 5. After the base line 570 is completed the vertical sweep wave form is abruptly varied by an amount such that during the next horizontal scanning period the base line 571 corresponding to the lines numbered 41, 42, 43–40, inclusive, is established. After the base line 571 has been completed the vertical sweep wave form is changed to a new value such that the base line 572, which corresponds to the lines numbered 71, 72, 73–70, inclusive, is established during the effective interval of the next horizontal sweep cycle and after the base line 572 is completed the vertical sweep wave form is abruptly changed to a new substantially constant value such that the base line 573, which corresponds to the lines numbered 01, 02, 03–00, inclusive, is established during the next horizontal sweep cycle. After the base line 573 is established, the beam of the cathode ray tube 520 is moved vertically to its initial position and, during the next vertical sweep cycle, assumes a substantially constant value such that the base line 574, corresponding to the lines numbered 21, 22, 23–20, inclusive, is established during the corresponding horizontal sweep cycle. After the base line 574 is established the vertical sweep wave form is successively changed to different substantially constant values so that the base lines 575 and 576 are established during the remainder of this vertical sweep cycle. During the next vertical sweep cycle the base lines 577, 578 and 579 are established during the corresponding step portions of the vertical sweep wave form. The vertical sweep circuit 502 also performs the function of supplying a control pulse to the ring drive stage 506 and also supplies a blanking pulse to the retraced blanking circuit 503. To perform the above described functions, the vertical sweep circuit 502 is connected to the units pulse ring circuit 20 over the conductor **31*h*, to the tens pulse ring circuit 21 over the conductor 32*c*, to the ring drive stage 506 over the conductor 530, to the signal pulse amplifiers and mixers 505 over the conductors 531 and 532 and to the retrace blanking circuit 503 over the conductor 535**.

The retrace blanking circuit 503 forms the function of combining the blanking pulses supplied thereto from the horizontal sweep circuit 501 and the vertical sweep circuit 502 to provide a composite blanking pulse which is supplied over the conductor 536 to the control grid of the cathode ray tube 520. The horizontal line blanking circuit 504 performs the function of producing blanking pulses of extremely short duration at the rate of one such pulse for each time position in each time position frame, these blanking pulses being supplied over the conductor 540 to the cathode of the cathode ray tube 520 so that the beam of the cathode ray tube is cut off for very short intervals during each horizontal line, or trace, produced on the face of the cathode ray tube. With this arrangement each horizontal line is marked off by the gaps 580 (Fig. 20) into ten divisions corresponding to the ten pulse time positions individually assigned to the lines of a particular subgroup. To perform this function the horizontal line blanking circuit 504 is connected to the phase shifter and pulse former circuit 19 (Fig. 4) over the conductor 40.

The ring drive stage 506 cooperates with the four stage ring circuit 507 to control the gate circuits 508, 509, 510 and 511 so that these gate circuits are sequentially opened during successive vertical sweep cycles. With this arrangement several different wave forms associated with the same time position may be simultaneously examined without interference therebetween. Thus, in the illustrated embodiment, the multiplexer pulses produced in the time position assigned to any one of the lines of the system are displayed on the face of the cathode ray tube 520 in the position assigned to this line as soon as a calling condition exists on the line. The connector pulses produced on the conductor 51 by the various connectors of the system as called lines are selected therein, are likewise displayed on the cathode ray tube 520 by means of the gate circuit 509 which is opened in sequence to the gate circuit 510. In a similar manner the busy pulses produced on the conductor 52 as the calling and called lines of the system are taken into use are displayed on the cathode ray tube 520 by means of the gate circuit 508 which is likewise sequentially controlled during successive vertical sweep cycles. The fourth gate circuit 511 is illustrated as a spare unit and any desired pulse wavetrain developed in the system may be simultaneously displayed on the cathode ray tube 520 by impressing the same on the gate circuit 511.

When a call is initiated on the illustrated line 23 multiplexer pulses are produced on the conductor 50 in the time position **64*b* assigned to this line and these multiplexer pulses are impressed upon the gate circuit 510. Accordingly, a positive pulse, or pip 590 is produced along the base line 574 in the time position 64*b* assigned to the line 23, thereby indicating to the supervisor that a calling condition exists on line 23. Assuming that the link 12 becomes operatively associated with the calling line 23, the circuit 202 in the finder 12*a* develops busy pulses in the time position assigned to the calling line 23 which appear on the conductor 52 and are impressed upon the gate circuit 508 so that a relatively wide busy pulse 591 is produced along the base line 574** in the time position assigned to the line 23 and in the opposite polarity from the multiplexer pulse 590. In this connection it will be understood that the pulses 590 and 591 are produced along the base line 574 during successive vertical sweep cycles and at a sufficiently rapid rate so that these pulses appear simultaneously to the observers. Also, when the finder 12*a* becomes operatively associated with the calling line 23, it develops finder gate pulses which are transmitted over the conductor 12*d* to the calling line outgate circuit 226 in the connector 12*b* so that connector pulses in the time position assigned to the line 23 are impressed upon the conductor 51 and transmitted over this conductor to the gate circuit 509. As a result, the connector pulses 592, which are the opposite polarity from the multiplexer pulses 590, are produced along the base line 574 in the time position assigned to the line 23. When the calling subscriber on the line 23 dials the number of the party which he wishes to call the amplitude of the multiplexer pulses 590 varies in accordance with the dial impulse modulation, this dial impulse modulation being clearly visible to the supervisor by inspection of the face of the cathode ray tube 520.

Assuming that the line 32 is called, the amplitude of the multiplexer pulses 590 will be modulated in accordance with the first dialed digit "3" and after the inter-digit pause the pulses 590 will be modulated by the two impulses constituting the second digit "2." As soon as the tens and units digits of the called line have been registered in the connector associated with the calling line 23, connector pulses appearing in the time position 63*c* assigned to the called line 32 are developed on the conductor 51 and these connector pulses are impressed upon the gate circuit 509. Accordingly, the negative going connector pulses 595 are produced along the base line 577 in the time position 63*c* assigned to the line 32 so that the supervisor is informed that the line 32 has been taken into use by the calling line 23. At substantially the same time, the connector associated with the line 23 develops busy pulses on the conductor 52 in the time position assigned to the called line 32 which are transmitted through the gate circuit 508 during the controlled vertical sweep cycles so that the busy pulses 596 are also developed along the base line 577 in the time position 63*c* assigned to the line 32. Accordingly, the supervisor is informed by the appearance of the busy pulses 596 that the called line 32 has been busied to all of the other finders and connectors of the system. During the ringing intervals the amplitude of the connector pulses 595 is increased by approximately 50% so as to actuate the ringing control facilities in the line circuit 16 associated with the called line 32 and this increase in amplitude of the connector pulses 595 is displayed on the cathode ray tube 520 so that the supervisor can determine that the called line 32 is being rung and can also determine the duration of the ringing intervals in the event that party line or code ringing is employed.

When the called line 32 answers, multiplexer pulses are produced on the conductor 50 in the time position 63*c* assigned to the line 32 and these multiplexer pulses are impressed upon the gate circuit 510 with the result that the multiplexer pulses 597 are produced along the base line 577 in the time position assigned to the line 32 and in the opposite polarity from the connector pulses 595. As conversation takes place between the lines 23 and 32 the speech modulation on the multiplexer pulses 590 and 597 and the connector pulses 592 and 595 is displayed so that the supervisor can determine that an actual call is in progress.

If the call is terminated by the subscriber on the line 32 hanging up, the multiplexer pulses 597 disappear but the busy pulses 596 and connector pulses 595 continue to appear along the base line 597. Accordingly, the supervisor can determine by an inspection of the cathode ray tube 520 whether or not any calling lines of the system are operatively associated with another line when an off-hook condition does not exist on this other line. When the call is terminated by the subscriber on the calling line 23 hanging up, the multiplexer pulses 590 immediately disappear with the result that the +B switching circuit 201 functions after a short time delay interval to remove the +B switch potential from the conductor 12*c* so that the controlled circuits are returned to their initial or quiescent values. As a result, the busy pulses 591 and 596 and the connector pulses 592 and 595 disappear from the screen of the cathode ray tube 520. If the called line 32 remains off-hook after the calling line 23 has hung up, the multiplexer pulses 597 continue to appear and the line 32 becomes a calling line and calls in a new finder-connector link with the result that new busy pulses and connector pulses are produced in the time positions assigned to the line 32 when the new linkage becomes operatively associated with the line 32. It will, therefore, be evident that the monitor station 500 permits the supervisor to maintain a continued and detailed supervision of the condition of all of the calling and called lines of the system and the condition of each of these calls.

To perform the above described signal gating functions, the ring drive stage 506 is supplied with a control signal from the vertical sweep circuit 502 over the conductor 530 and provides ring drive pulses which occur at the rate of one such pulse for every two pulse frames of the telephone system, i. e., one pulse every 200 microseconds, it being understood that each vertical sweep cycle lasts for two pulse frames for reasons which will be described in more detail hereinafter These ring drive pulses are supplied over the conductor 545 to the four-stage ring circuit 507 and this latter circuit performs the function of opening the gate circuits 508, 509, 510 and 511 in succession and for the duration of one vertical sweep cycle. Thus, gating signals of approximately 200 microseconds duration are successively supplied over the conductors 550, 551, 552 and 553 to the gate circuits 508, 509, 510 and 511 respectively. The output signals from the gate circuits 508 and 509 are transmitted over the conductor 555 to the signal pulse amplifiers and mixers wherein they are amplified and are transmitted over the conductor 558 to one of the vertical plates of the cathode ray tube 520. In the illustrated embodiment, the signals passed by the gate circuits 508 and 509 produce a downward deflection of the cathode ray tube beam, as will be clearly evident from Fig. 20 wherein the connector pulses and busy pulses are of the negative polarity, so that the signals on the conductor 558 are applied to the appropriate deflection plate of the tube 520 to produce the desired downward deflection. On the other hand, the gate circuits 510 and 511 are connected over the conductor 557 to the signal pulse amplifiers and mixers 505 and are impressed over the conductor 556 to the other vertical deflection plate of the cathode ray tube 520 so as to produce an upward deflection for the corresponding signals. Accordingly, the multiplexer pulses which are impressed upon the gate circuit 510 produce upward deflections, as will be clearly evident from Fig. 20 wherein the multiplexer pulses 590 and 597 are of the positive polarity. In this connection it will be understood that if a fourth signal is applied to the gate circuit 511 the corresponding deflection produced thereby will be in the same polarity as the multiplexer pulses 590 and 597. The signal pulse amplifiers and mixers 505 also function to mix the vertical sweep wave forms developed on the conductors 531 and 532 with the signals gated by the gate circuits 508, 509, 510 and 511 so that all of these signals may be impressed upon the appropriate vertical deflection plates of the cathode ray tube 520.

Figure 11:
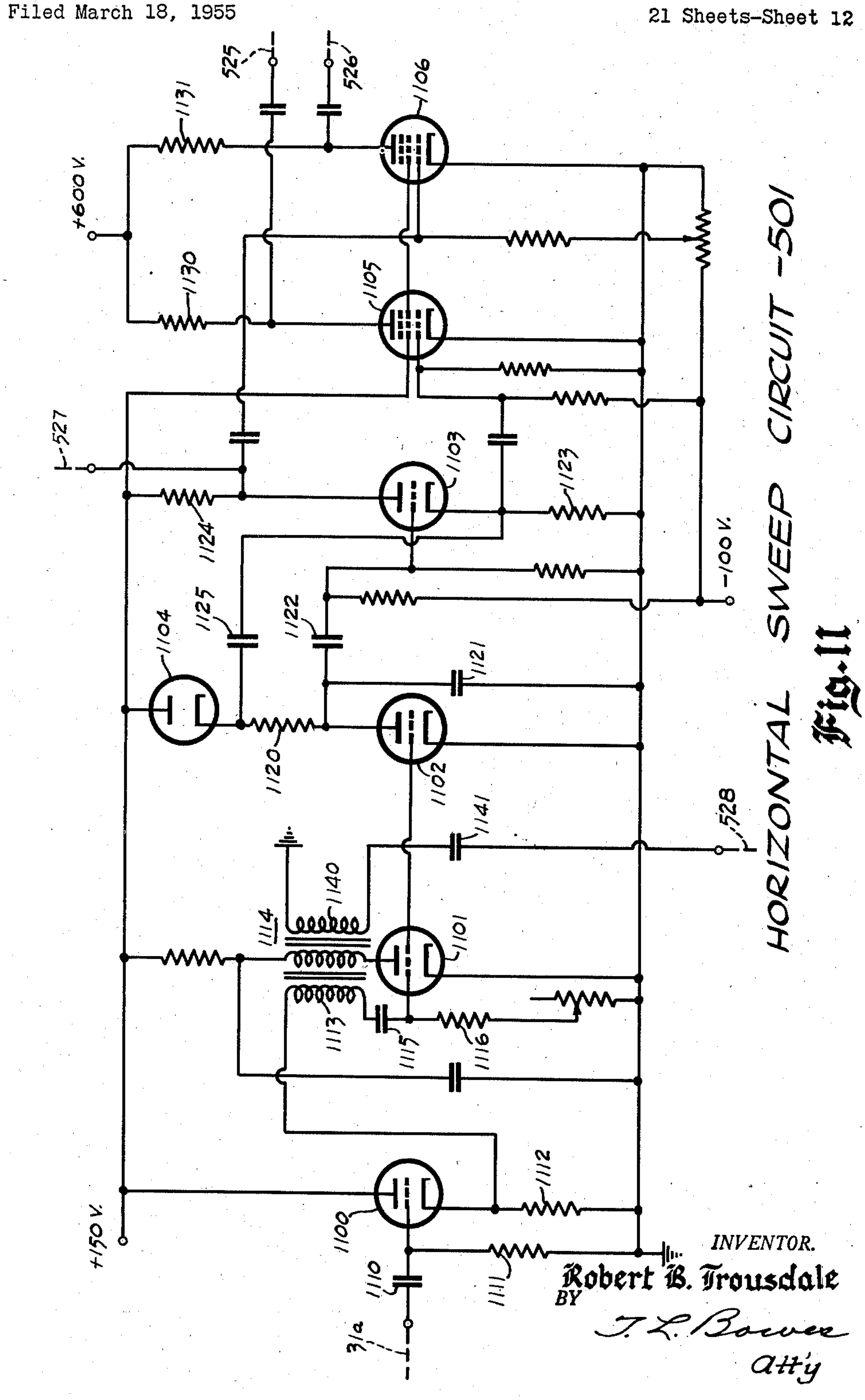

Considering now the detailed circuit arrangements of the traffic monitor system of the present invention, which are shown in Figs. 11 to 19, inclusive, of the drawings, the horizontal sweep circuit 501 is illustrated in Fig. 11 as comprising a cathode follower input tube 1100, a blocking oscillator tube 1101, a sweep generator tube 1102, a phase inverter tube 1103, a linearizing diode 1104, and a pair of output tubes 1105 and 1106. Preferably the tubes 1100, and 1103 are of the commercial type 6C4, the tubes 1101 and 1102 together comprise a double triode of the commercial type 6J6, the diode 1104 comprises one half of a commercial type 6AL5 double diode and the output tubes 1105 and 1106 are pentodes of the commercial type 6AK6.

The positive units pulses appearing upon the conductor *31a* are differentiated in the circuit including the series condenser 1110 and the shunt resistor 1111 so that sharp positive pulses are impressed upon the control grid of the cathode follower tube 1100 at the rate of ten such pulses for each pulse frame of 100 microseconds duration, these sharp pulses being repeated across the cathode resistor 1112 of the tube 1100. The pulses appearing across the resistor 1112 are coupled to the control winding 1113 of a blocking oscillator transformer, indicated generally as 1114, and the time constant of the control grid condenser 1115 and resistor 1116 is so chosen that the blocking oscillator tube 1101 conducts only during every third units pulse interval. Accordingly, the blocking oscillator tube 1101 is held non-conductive for substantially the entire interval of 30 time positions, i. e., 30 microseconds, and the control grids of the tubes 1101 and 1102 are connected together so that the tube 1102 is held non-conductive for the same interval as the tube 1101. In the anode circuit of the tube 1102 a charging resistor 1120 and shunt connected charging condenser 1121 are provided so that a sawtooth voltage is produced across the condenser 1121. This sawtooth voltage is coupled through the condenser 1122 to the control grid of the phase inverter tube 1103, and is repeated in like phase across the cathode resistor 1123 of the tube 1103 and in the opposite phase across the anode resistor 1124 of the tube 1103.

In order to provide a linear sawtooth wave form a feedback circuit, including the condenser 1125 and the diode rectifier 1104, is employed to couple the wave form appearing across the resistor 1123 to the high voltage end of the anode resistor 1120 so that a substantially constant charging voltage is provided for the condenser 1121. The sawtooth voltages appearing across the resistors 1123 and 1124 are respectively impressed upon the control grids of the output tubes 1105 and 1106 so as to develop corresponding sawtooth voltages of relatively large amplitude across the anode resistors 1130 and 1131 of the tubes 1105 and 1106 respectively. The push-pull sweep voltages produced across the resistors 1130 and 1131 are transmitted over the conductors 525 and 526 respectively to the horizontal deflection plates 1800 and 1801 (Fig. 18) of the cathode ray tube 520, the dual potentiometer 1802 being provided to center the horizontal trace on the face of the cathode ray tube 520, as will be readily understood by those skilled in the art. As a result, the horizontal sweep wave from 2100 (Fig. 21) is produced at the anode of the tube 1105. Due to the capacities of the circuits connected to the deflection plates 1800 and 1801 considerable rounding off of the corners of the horizontal sweep wave form 2100 is produced. However, as described in more detail hereinafter, only the latter portion of each horizontal sweep cycle is employed as a usable trace on the cathode ray tube 520 so that considerable non-linearity of the other portions of the horizontal sweep wave forms can be tolerated. Thus, only the linear portions 2101, 2102 and 2103 (Fig. 21) are employed during successive horizontal sweep cycles in the first vertical sweep cycle shown in Fig. 21 to provide horizontal traces corresponding to the time positions assigned to the lines 21, 22–29, inclusive; 51, 52–59, inclusive; and 81, 82–89, inclusive, as will be readily apparent from Fig. 21.

Figures 12, 13:
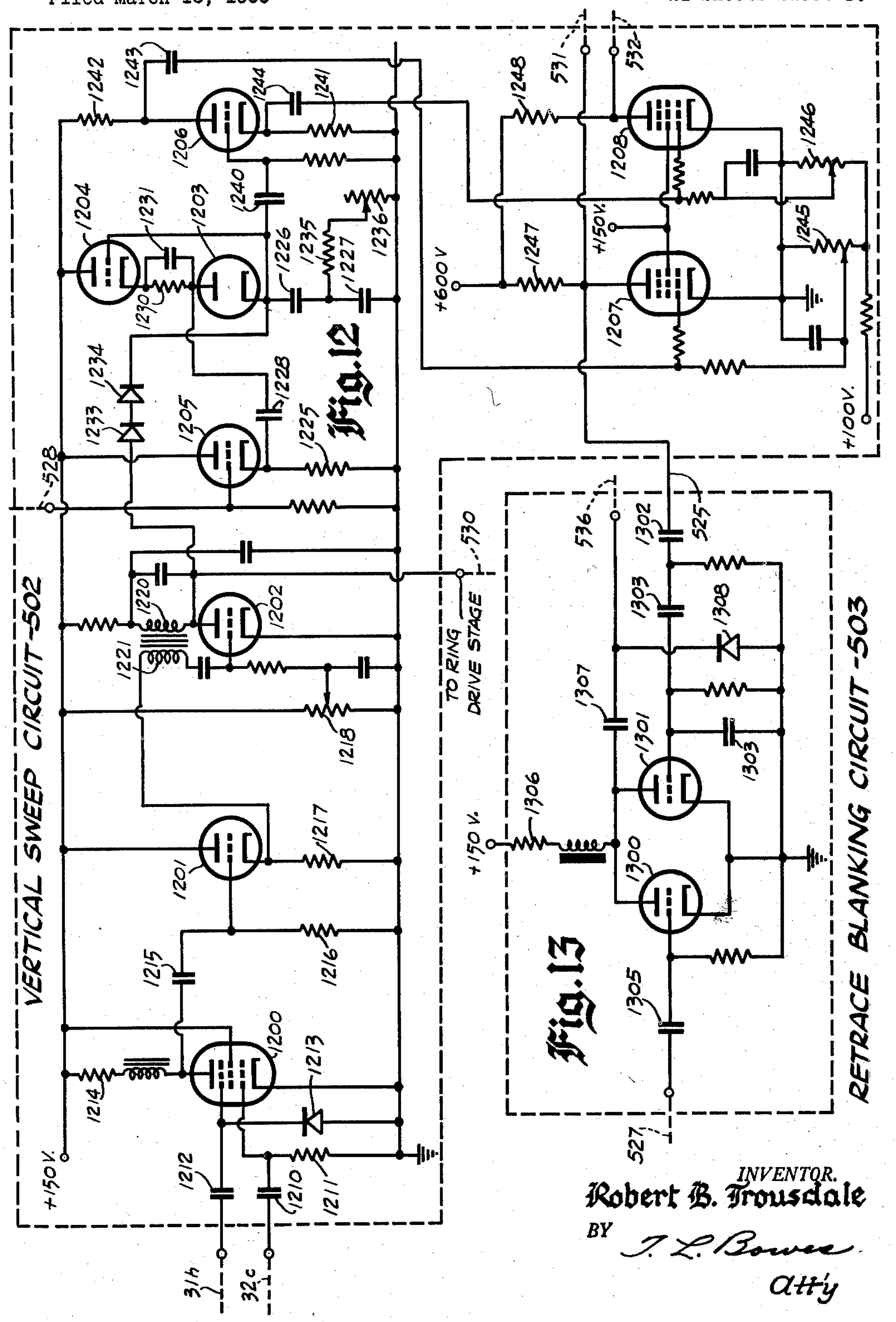
Figures 14, 15:
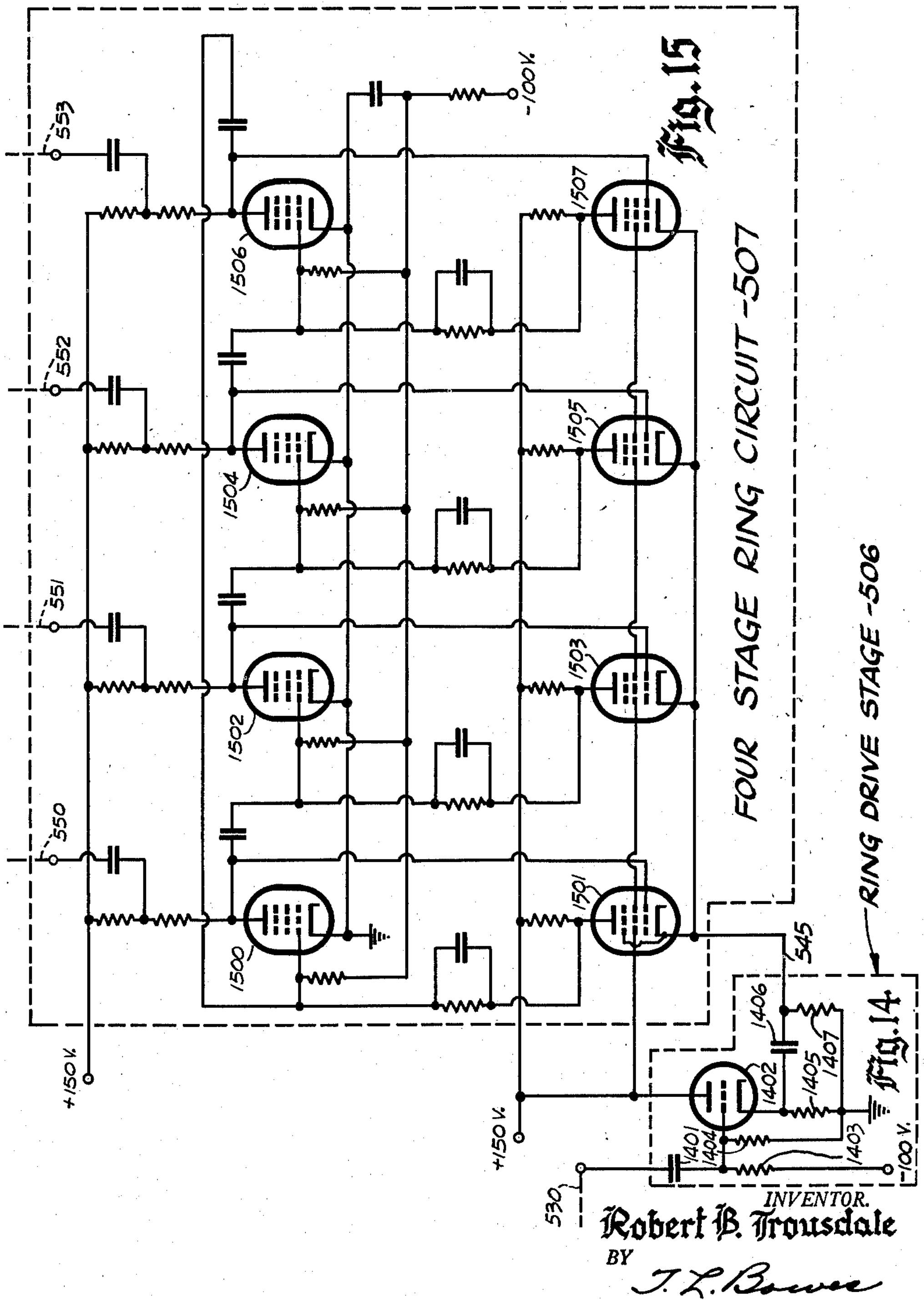

Considering now the vertical sweep circuit 502, shown in detail in Fig. 12 of the drawings, it will be recalled from the general description of the system that the circuit 502 is provided for the purpose of generating a stepped vertical deflection wave which is suitable for displacing the horizontal traces developed by the horizontal sweep circuit 501 so that ten horizontal traces are produced in a predetermined sequence to display signals representative of each line in the 100-line system. More particularly, the vertical sweep circuit 502 comprises a pulse mixing tube 1200, a cathode follower driver tube 1201, a blocking oscillator tube 1202, a step generator charging diode 1203, a step generator feedback tube 1204, a step voltage driver tube 1205, a phase inverter tube 1206 and a pair of output tubes 1207 and 1208. Preferably the tubes 1201, 1202, 1204, 1205 and 1206 are triodes of the commercial type 6C4, the tube 1200 is a pentode of the commercial type 6AS6, the diode 1203 is of the commercial type 6AL5 and the pentodes 1207 and 1208 are of the commercial type 6AK6.

It will be recalled from the general description of the system that the step deflection wave developed by the vertical sweep circuit 502 has a duration equal to two full time position frames so that the vertical sweep repetition rate, in the illustrated embodiment, is 5 kilocycles per second. A timing signal for the vertical sweep circuit 502 is derived from the tens pulse ring 21 so that the vertical deflection wave will occur synchronously with the pulses developed in the time positions assigned to individual lines of the system. However, in order to provide the correct phase relationship between the vertical deflection wave and the signal to be displayed on the cathode ray tube 520, and in order to compensate for various phase delays in the system, the tens pulses appearing upon the conductor *32c* in the time position *74a* are mixed with the positive unit pulses appearing upon the conductor *31h* in the tube 1200 so that a composite triggering pulse appearing in the time position *69c* in each pulse frame is produced at the anode of the tube 1200. More particularly, the tens pulses appearing upon the conductor *32c* are coupled through the condenser 1210 to the first control grid of the tube 1200, a grid leak resistor 1211 being connected from this control grid to ground. The units pulses appearing upon the conductor *31h* are coupled through the condenser 1212 to the suppressor grid of the tube 1200, a clamping rectifier 1213 being connected from this grid to ground so as to prevent the grid from becoming positive with respect to the cathode of the tube 1200. Accordingly, the tube 1200 conducts only during coincidence of the tens pulses appearing upon the conductor *32c* and one of the unit pulses appearing on the conductor *31h* so that a pulse appearing in the time position *69c* is developed across the anode resistor 1214 of the tube 1200. This pulse is differentiated in the circuit including the coupling condenser 1215 and the resistor 1216 so that a sharp positive pulse is produced across the cathode resistor 1217 of the cathode follower tube 1201 at the end of the time position *69c*. This sarp positive pulse is employed to control the blocking oscillator 1202, the control grid time constant of which may be varied by means of the potentiometer 1218 so that the blocking oscillator tube 1202 conducts only during every other pulse frame, i. e., at a repetition rate of 5 kilocycles per second. The blocking oscillator pulses produced across the plate winding 1220 of the blocking oscillator transformer 1221 are employed to control the retrace period of the step deflection vertical deflection wave and are also transmitted over the conductor 530 to the ring drive stage 506.

While the 5 kilocycle pulses produced by the blocking oscillator 1202 are employed to control the retrace intervals of the stepped vertical deflection wave, the timing of the individual steps of this wave is provided by the horizontal sweep circuit 501. Since the sweep circuit 501 has a periodicity of 30 microseconds, i. e., a duration equal to the time positions assigned to 30 lines in the system, the horizontal retrace period occurred every two pulse frame, i. e., every 200 microseconds, it will be evident that the wave shape of the vertical deflection wave series in a predetermined pattern during successive vertical deflection cycles so as to permit presentation of all ten traces on the face of the cathode ray tube 520. More particularly, the blocking oscillator pulses produced across the auxiliary winding 1140 of the blocking oscillator transformer 1114 in the horizontal sweep circuit 501 are coupled through the condenser 1141 and over the conductor 528 to the control grid of the cathode follower tube 1205 in the vertical sweep circuit 502 wherein they are repeated in like phase across the cathode resistor 1225 of the tube 1205. The pulses produced across the resistor 1225 are employed to charge the series connected condensers 1226 and 1227 through the charging diode 1203 and the condenser 1228, the condensers 1226, 1227 and 1228 being of relatively small value so as to be charged in proportion to the amplitude of the pulses produced across the resistor 1225. In order to discharge the coupling condenser 1228 between pulses so that a stepped wave form is produced across the condensers 1226 and 1227, the discharging triode 1204 is connected from the B+ conductor through the parallel connected resistor 1230 and condenser 1231 to the anode of the diode 1203, the control grid of the tube 1204 being connected to the cathode of the diode 1203. The retrace or discharging pulses developed by the blocking oscillator tube 1202 are coupled through the series connected rectifiers 1233 and 1234 of the cathode of the diode 1203.

Considering now the manner in which a stepped vertical deflection wave is produced across the condensers 1226 and 1227, it will be evident that when a horizontal trigger pulse is developed across the cathode resistor 1225 the condensers 1228, 1226 and 1227 are charged to proportional voltages in inverse ratio to their capacities. After the pulse across the resistor 1225 disappears the diode 1203 is rendered non-conductive so that the charge remains on the condenser 1226 until the next pulse appears across the cathode resistor 1225. However, due to the resistor 1235 and the potentiometer 1236 connected across the condenser 1227, the condenser 1227 is discharged between each pulse.

Figure 21:
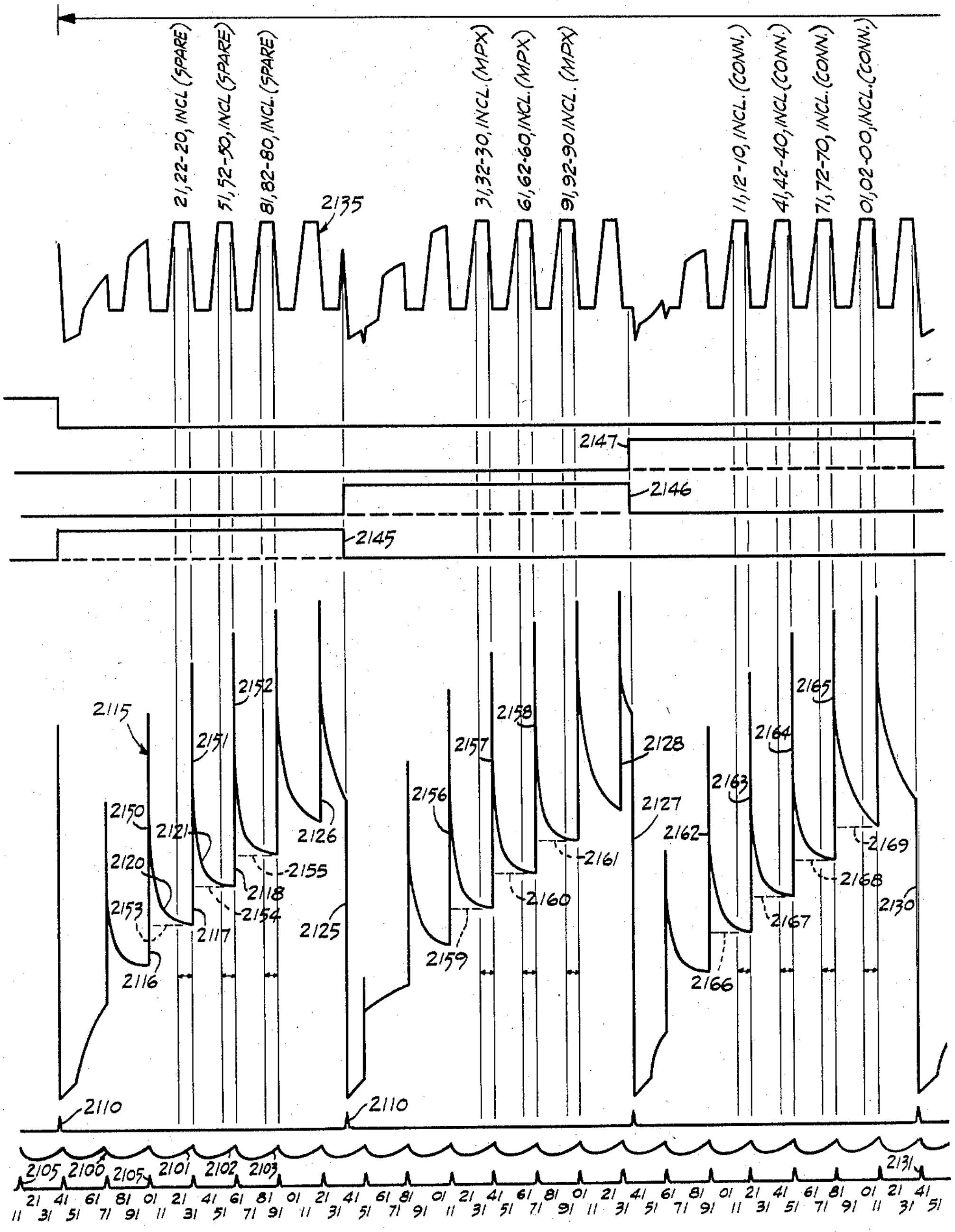
Figure 22:
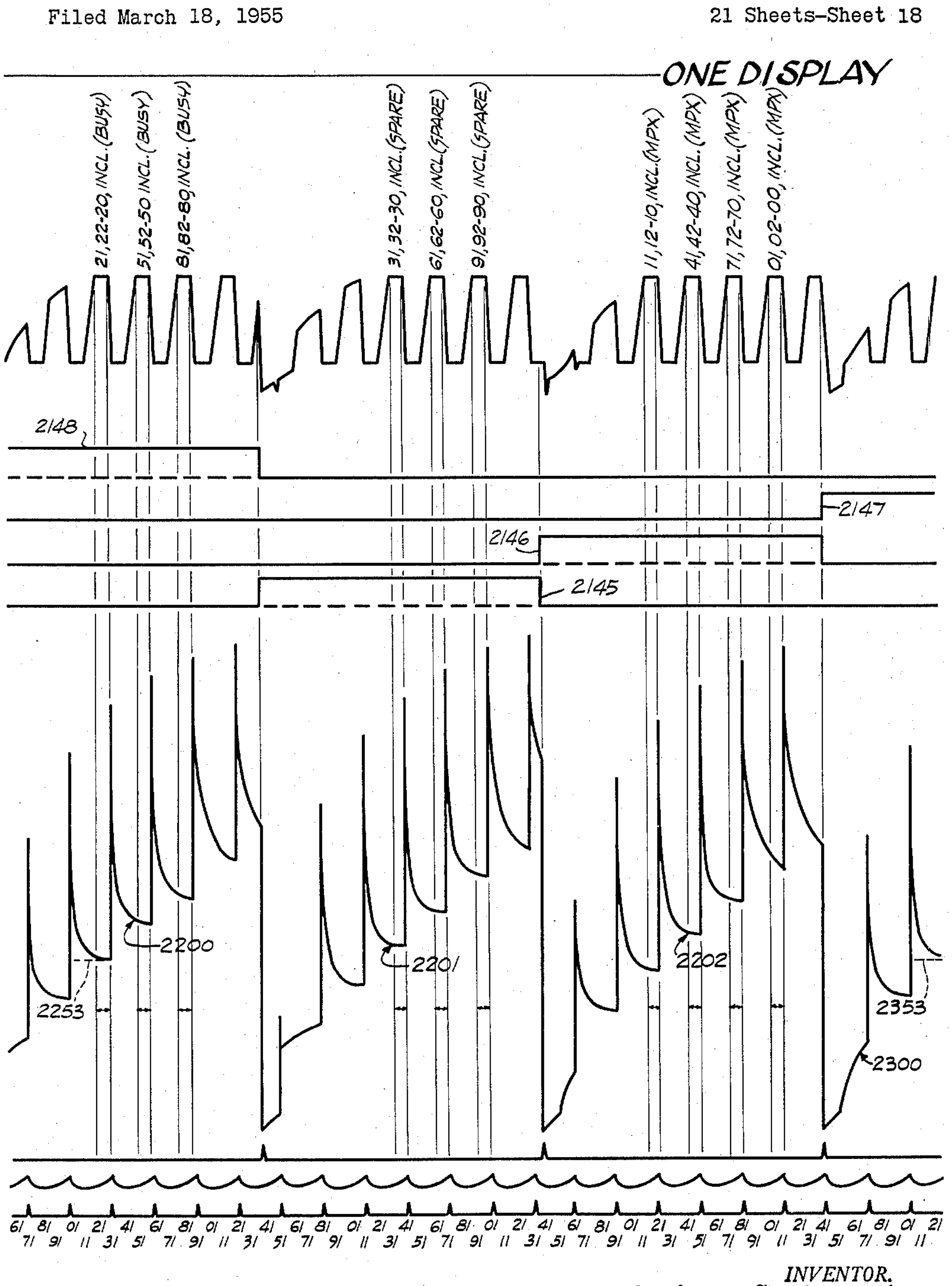
Figure 23:
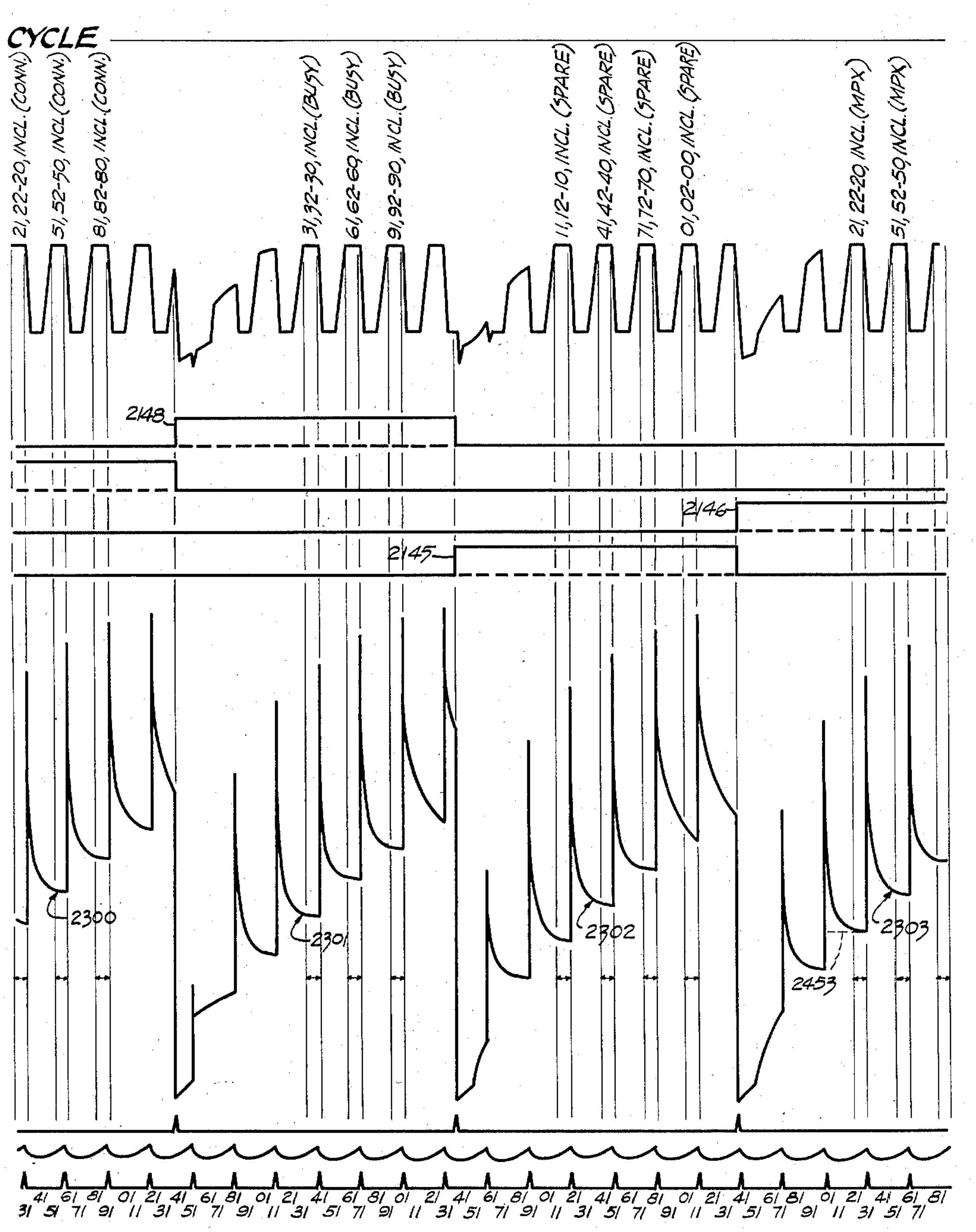
Figure 24:
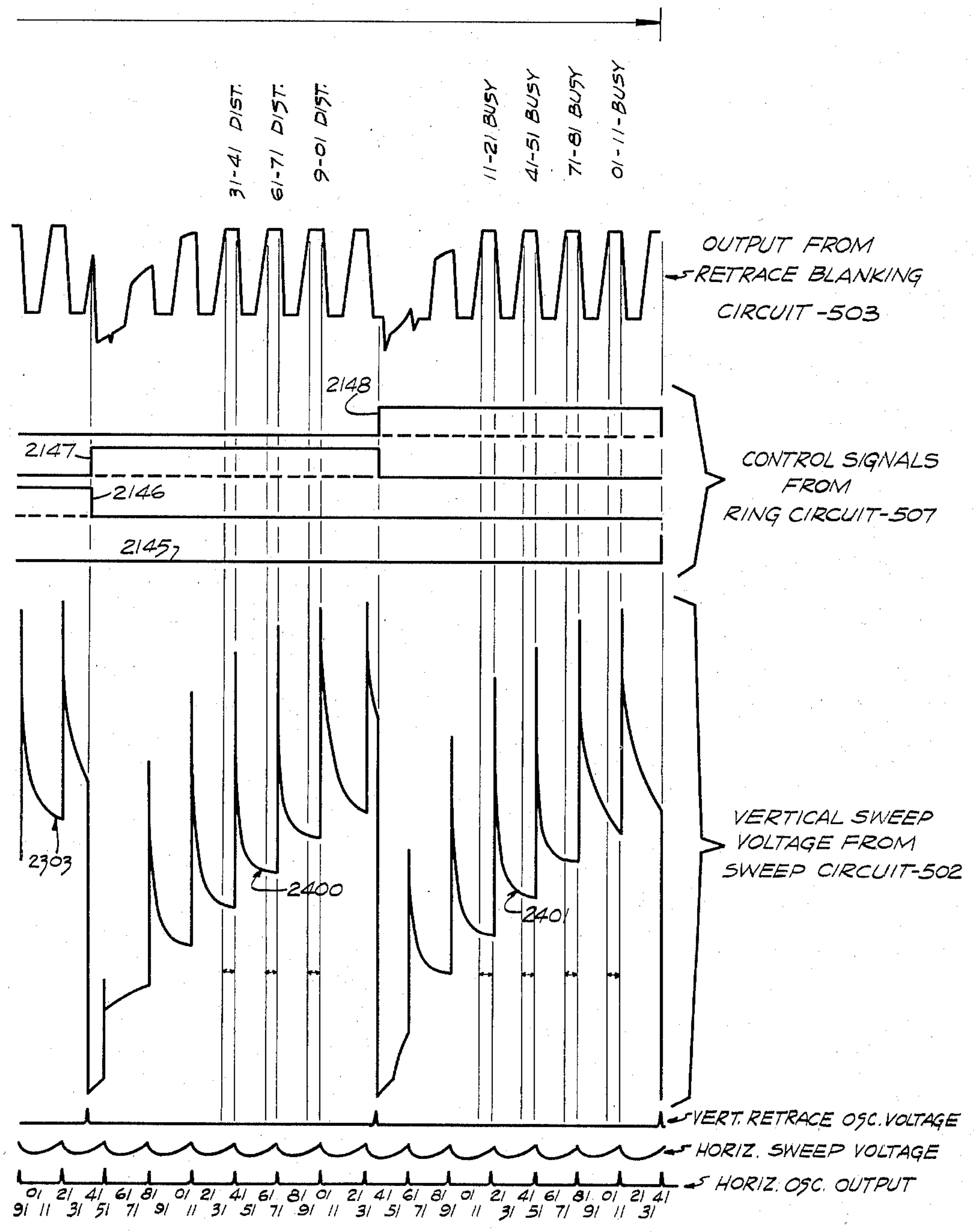

The wave form thus produced across the condensers 1226 and 1227 is shown in Figs. 21 to 24, inclusive. Referring to these figures, it will be evident that one complete display cycle comprises twelve successive vertical sweep cycles, each three successive vertical sweep cycles being sufficient to produce ten usable horizontal traces on which any one wave form may be displayed in any time position of the 100 time positions making up the pulse frame, four successive repetitions of these three successive vertical sweep cycles being required to display four different wave forms in any given time position under the control of the gate circuits 508, 509, 510 and 511. The positive trigger pulses developed by the horizontal sweep circuit 501 are shown in Fig. 21 as the positive pulses 2105 and it is evident that the pulses 2105 are spaced apart by an amount equal to the time positions assigned to 30 lines of the system, i. e., by 30 microseconds. The positive retrace pulses developed by the blocking oscillator tube 1202 in the vertical sweep circuit 502 are shown in Fig. 21 as the pulses 2110 and it will be evident that the pulses 2110 are spaced apart by an amount equal to 200 time positions, i. e., 200 microseconds, so that the pulses 2110 occur at the rate of one pulse for every two time position frames. Since the pulses 2105 do not occur at even multiples of the repetition rate of the pulses 2110, the phase relationship between these pulses varies in a predetermined pattern which is repeated every three vertical sweep cycles, i. e., the common multiple of 30 microseconds and 200 microseconds which is 600 microseconds.

The pulses 2105 are produced across the cathode resistor 1225 in the vertical sweep circuit 502 so that the condensers 1226 and 1227 are charged through the diode 1203 and in series with the condenser 1228, the condensers 1228, 1226 and 1227 being charged in inverse proportion to their capacities. Preferably the condenser 1226 has a value of 1000 micromicrofarads, the condenser 1227 has a value of 200 micromicrofarads and the condenser 1228 has a value of 200 micromicrofarads. With these capacities, a relatively small voltage is produced across the condenser 1226 and voltages approximately five times larger are developed across the condensers 1227 and 1228. The composite voltage appearing across the condensers 1226 and 1227 is shown in Fig. 21 by the waveform indicated generally at 2115, and it will be evident that abrupt voltage steps such as the voltage step 2116, 2117 and 2118, are produced across the condensers 1226 and 1227 in response to the corresponding ones of the pulses 2105. However, due to the resistor 1235 and potentiometer 1236 connected across the condenser 1227, the voltage across the condenser 1227 is rapidly dissipated through these elements so as to produce a rapidly decaying trailing edge portion instead of a substantially constant ledge portion. Thus, after the abrupt voltage step 2116, the charge on the condenser 1227 is dissipated to form the sloping portion 2120, the condenser 1227 being substantially discharged before the next voltage step 2117. In a similar manner after the voltage step 2117 the sloping portion 2121 is produced by discharge of the condenser 1227. As will be described in more detail hereinafter the sharp peaks produced at the beginning of each step by the above described discharge action of the condenser 1227 are provided for the purpose of compensating for integration which takes place in the vertical deflection circuit of the cathode ray tube 520 so that the actual deflection of the cathode ray tube beam approaches an ideal staircase waveform.

When a vertical retrace pulse 2110 is produced by the tube 1202, this pulse is coupled through the rectifiers 1233 and 1234 to the condensers 1226 and 1227 and functions to discharge these condensers abruptly as indicated by the abrupt drop in potential 2125 shown in Fig. 21. However, it will be noted that during successive vertical sweep cycles, the relationship of the vertical retrace to the stepped portions of the wave vertical deflection wave varies. Thus, in the first vertical sweep cycle shown in Fig. 21 the vertical retrace 2125 occurs a substantial period after the stepped portion 2126. During the next vertical sweep cycle the retrace 2127 occurs just slightly after the preceding stepped portion 2128 and in the third vertical sweep cycle shown in Fig. 21 the vertical retrace interval 2130 occurs substantially simultaneously with the abrupt step portion produced by the corresponding pulse 2131.

The composite wave form 2115 developed across the condensers 1226 and 1227 in the manner described above is coupled through the condenser 1240 to the control grid of the phase inverter tube 1206 and is repeated in like phase across the cathode resistor 1241 of this tube. A voltage of the opposite phase is produced across the anode resistor 1242 of the tube 1206 and the anode and cathode voltages of tube 1206 are coupled through the condensers 1243 and 1244, respectively, to the control grids of the output tubes 1207 and 1208. The control grid potentials of the tubes 1207 and 1208 may be varied by means of the linearity potentiometers 1245 and 1246, respectively, and push-pull vertical deflection voltages are produced across the anode resistors 1247 and 1248 of the tubes 1207 and 1208, respectively. The deflection voltage produced across the resistor 1247 is transmitted over the conductor 531, through the resistor 1805 and the condenser 1809 to the vertical deflection plate 1807 of the cathode ray tube 520. In a similar manner the deflection voltage produced across resistor 1248 is transmitted over the conductor 532, through the resistor 1808 and the condenser 1806 to the other vertical deflection plate 1810 of the cathode ray tube 520. A suitable dual potentiometer 1811 is provided for vertical centering purposes to adjust the D. C. potentials of the deflection plates 1807 and 1810.

The vertical deflection voltage produced across the resistor 1247 is also transmitted over the conductor 535 to the retrace blanking circuit 503 which is shown in detail in Fig. 13 as comprising the triode mixer tubes 1300 and 1301. Preferably the tubes 1300 and 1301 constitute a double triode of the commercial type 6J6. In the circuit 503 the vertical deflection wave form is coupled through the condensers 1302 and 1303 to the control grid of the triode 1301, the condenser 1303 being connected between the control grid of the tube 1301 and ground so as to integrate the vertical deflection waveform slightly. The horizontal deflection voltage produced across the resistor 1124 in the sweep circuit 501, is transmitted over the conductor 527 and through the condenser 1305 to the control grid of the triode 1300. A common anode load resistor 1306 is employed for the triodes 1300 and 1301 so that the voltages applied to the control grids of these tubes are mixed in the common anode circuit to provide a composite blanking signal which is coupled through the condenser 1307 and over the conductor 536 to the control grid 1812 of the cathode ray tube 520. A clamping rectifier 1308 is connected between the control grid 1812 and ground so as to prevent the control grid 1812 from becoming positive with respect to ground during the peak of the blanking waveform. The composite blanking waveform developed in the common anode circuit of the tubes 1300 and 1301 is shown in Figs. 21 to 24, inclusive, as the waveform 2135 and it will be evident from a comparison of the waveform 2135, the vertical deflection wave form 2115 and the horizontal deflection waveform 2100 that the control grid 1812 and the cathode ray tube 520 is made highly negative except during successive scanning intervals of ten time positions each.

In order to display a plurality of different waveforms in any desired time position of the system, the discharge pulses developed by the blocking oscillator tube 1202 in the vertical deflection circuit 502 are also employed as ring drive pulses and are transmitted over the conductor 530 and through the condenser 1401 to the control grid of the ring drive cathode follower tube 1402. The control grid of the tube 1402 is biased to cut off by means of a voltage divider 1403 and 1404 so that only the positive portions of the pulses appearing upon this control grid are reproduced across the cathode resistor 1405 thereof. These positive pulses which occur at 200 microsecond intervals and correspond to the vertical retrace pulses 2110 shown in Fig. 21, are coupled through the condenser 1406 to the common cathode resistor 1407 of the four stage ring circuit 507. The ring circuit 507 is substantially identical to the units pulse ring 20 and tens pulse ring 21 described in detail in the copending application Serial No. 134,974, identified above, so that a detailed description thereof is considered unnecessary herein. However, for the purposes of the present invention it may be stated that each stage of the ring circuit 507 comprises a pair of pentodes which are interconnected as an electronic switching stage and are successively actuated in response to the drive pulses produced across the resistor 1407. Thus, the tubes 1500 and 1501 are interconnected as a first electronic switching stage, the tubes 1502 and 1503 are interconnected as the second electronic switching stage, the tubes 1504 and 1505 are interconnected as the third switching stage and the tubes 1506 and 1507 are interconnected as the last electronic switching stage. Preferably, the tubes 1500 to 1507, inclusive, are of the commercial type 6AK6. The above described switching stages are successively actuated by means of the ring drive pulses produced across the resistor 1407 so that successive gate pulses of 200 microseconds duration are produced on the output condensers 550 to 553, inclusive, of the circuit 507. Thus, during the period when tube 1500 in the first switching stage is rendered non-conductive, the positive gate pulse 2145 (Fig. 21) is produced on the output conductor 550. When the tube 1502 is rendered non-conductive the gate voltage 2146 is produced on the conductor 551, when the tube 1504 is rendered non-conductive the gate voltage 2147 is produced on the conductor 552 and when the tube 1506 is non-conductive, the gating wave form 2148 is produced on the conductor 553.

Figures 16, 17, 18, 19:
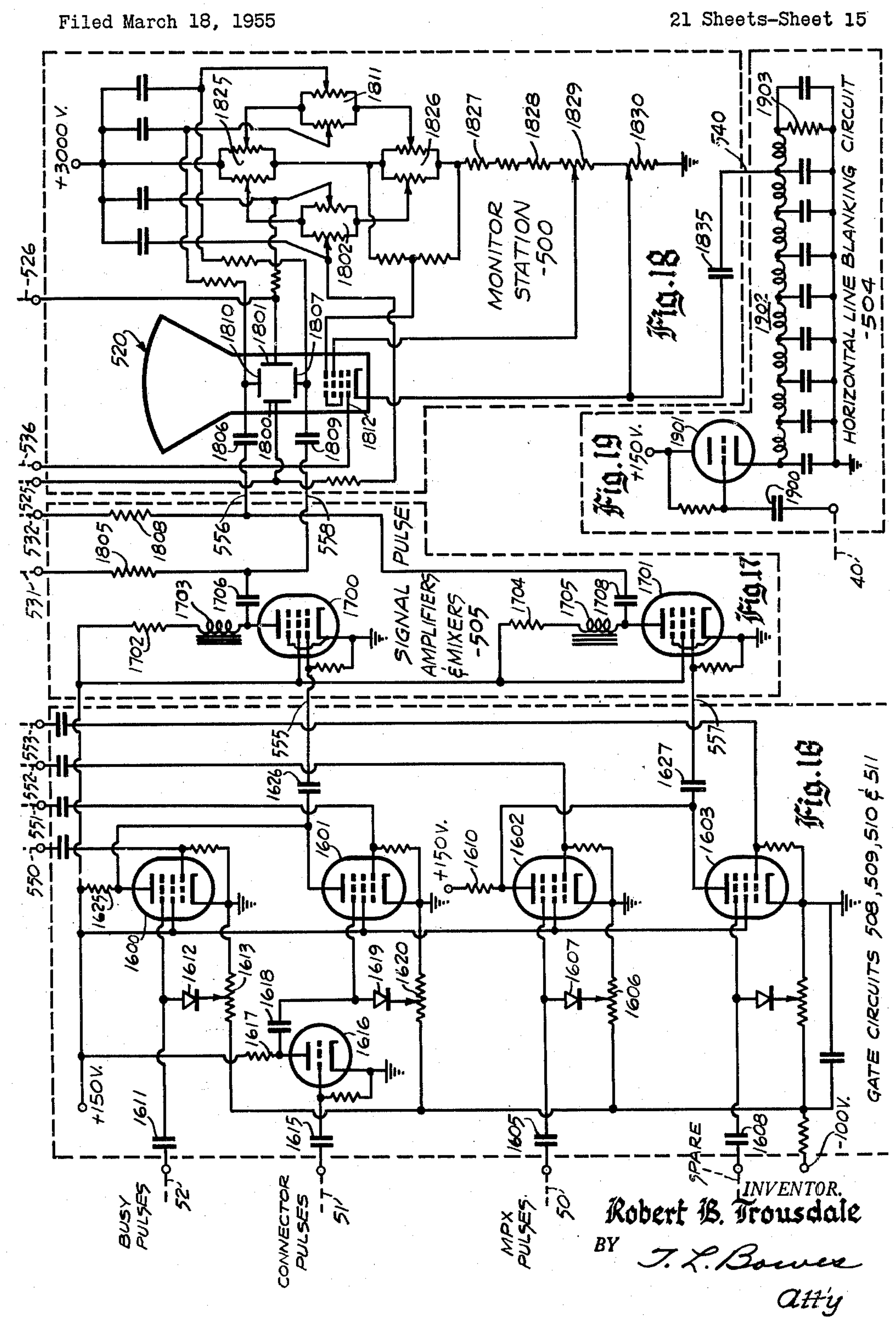

The gating voltages 2145 to 2148, inclusive, are employed to control the periods during which waveforms may be superimposed on the vertical deflection plates of the cathode ray tube 520 so that a plurality of waveforms may be simultaneously displayed on the monitor scope. More particularly, the gate voltages produced on the conductors 550 to 553, inclusive, are impressed upon the first control grids of a plurality of control tubes 1600, 1601, 1602 and 1603, respectively, in the gate circuits 508, 509, 510 and 511, as shown in Fig. 16 of the drawings. The multiplexer pulses developed on the conductor 50 in the time positions assigned to active lines of the system, are coupled through the condenser 1605 to the suppressor grid of the gate tube 1602, the bias of this suppressor grid being controlled by the potentiometer 1606. A rectifier 1607 is employed to maintain the baseline of the multiplexer pulse wave form substantially constant irrespective of the number of lines in use.

In the illustrated embodiment the gate tube 1603 is used as a spare unit and any desired waveform may be coupled through the condenser 1608 to the suppressor grid of the gate tube 1603. The anodes of the tubes 1602 and 1603 are connected together and through the common anode resistor 1610 to the positive supply potential so that the waveforms individually gated by tubes 1602 and 1603 are mixed together in the common anode resistor 1610. The busy pulses appearing upon the conductor 52 in the time positions assigned to occupied lines of the system are coupled through the condenser 1611 to the suppressor grid of the gate tube 1600, a clamping rectifier 1612 and bias setting potentiometer 1613 being employed to set the suppressor grid potential for correct gate tube operation and maintain the base line of the busy pulse waveform substantially constant. The connector pulses which are developed on the conductor 51 as various called lines are selected in the connectors of the system, are coupled through the condenser 1615 to the control grid of a triode inverted tube 1616. Preferably, the tubes 1600 to 1603, inclusive, are of the commercial type 6AS6 and the tube 1616 is of the commercial type 6C4. These connector pulses are inverted in polarity and appear across the anode resistor 1617 of the tube 1616 and are impressed upon the suppressor grid of the gate tube 1601 through the condenser 1618, a clamping rectifier 1619 and bias setting potentiometer 1620 being provided to maintain the base line of the connector pulse wave form substantially constant. The anodes of the tubes 1600 and 1601 are connected together through a common anode resistor 1625 to the positive supply potential so that the busy pulse waveform and the connector pulse waveform are mixed in the common anode circuit of these tubes.

The combined busy pulse and connector pulse waveform is coupled through the condenser 1626 and over the conductor 555 to the control grid of the signal pulse amplifier and mixer tube 1700 in the circuit 505. In a similar manner, the multiplexer pulse waveform is coupled through the condenser 1627 and over the conductor 557 to the control grid of the signal pulse amplifier and mixer tube 1701. The tubes 1700 and 1701 are preferably of the commercial type 6AK6. The tube 1700 is provided with a relatively small anode load resistor 1702 and a compensating coil 1703 to increase the frequency response of the output of this tube and to permit faithful reproduction of the pulse waveforms which include high frequency components. In a similar manner the tube 1701 is provided with a small anode load resistor 1704 and a compensating coil 1705. The anode of the tube 1700 is connected through the condenser 1706 and the high voltage condenser 180 to the vertical deflection plate 1807 of the cathode ray tube 520. In the illustrated embodiment, the busy pulses and connector pulses are displayed as negative going pulses so that the plate 1807 is the bottom vertical deflection plate and the positive busy pulses and connector pulses impressed upon this deflection plate produce the desired downward deflection of the beam. In a similar manner, the positive multiplexer pulses produced at the anode of the tube 1701 are coupled through the condenser 1708 and through the high voltage condenser 1806 to the top vertical deflection plate 1810 so as to produce the positive multiplexer pulses 590 (Fig. 20) in the time positions assigned to active lines of the system.

At the monitor station 500 the cathode ray tube 520 is preferably of the commercial type 8BP4 and is energized from a high voltage source by means of the high voltage bleeder network including the dual potentiometers 1825 and 1826, the series connected resistors 1827 and 1828 and the potentiometers 1829 and 1830 which are connected between the high voltage terminal and ground. The focusing anode of the tube 520 is connected to the potentiometer 1829 so as to provide for correct focus of the cathode ray tube beam and the cathode of the tube 520 is connected to the arm of the potentiometer 1830 so that an adjustment of the intensity of the cathode ray tube beam may be made.

In order to produce the holes or breaks 580 in the horizontal base lines displayed on the face of the cathode ray tube 520, the ring drive pulses *95a*, which appear on the conductor 40 at the beginning of each time position in each time position frame, are coupled through the condenser 1900 to the control grid of the horizontal line blanking tube 1901. Preferably, the tube 1901 is of the commercial type 6C4. In the cathode circuit of the tube 1901 there is provided a delay line indicated generally by the numeral 1902 which is provided for the purpose of delaying the horizontal line blanking pulses appearing at the cathode tube 1901 by an amount commensurate with the time delay in the actual circuits of the telephone system so that the multiplexer pulses, connector pulses, and busy pulses displayed on the cathode ray tube 520 will be properly framed by the marker holes 580 in the horizontal traces and so that the pulses which are to be displayed in a particular time position actually appear in that time position on the face of the cathode ray tube 520. The transmission line 1902 is terminated by means of the load impedance 1903 and the appropriately delayed horizontal line blanking pulses are transmitted over the conductor 540 and are coupled through the condenser 1835 to the cathode of the cathode ray tube 520. The horizontal line blanking or marker pulses which are impressed upon the cathode of the tube 520 are of positive polarity so that the cathode ray tube beam is cut off for the duration of each horizontal line blanking pulse with the result that the marker holes 580 are produced in the horizontal traces displayed on the cathode ray tube 520.

As described heretofore in connection with the signal pulse amplifier and mixer tubes 1700 and 1701, the anode circuits of these tubes are necessarily of relatively low impedance so as to permit the faithful reproduction of pulse waveforms having relatively high frequency components. On the other hand, the impedances across which the vertical deflection waveforms are developed by the output tubes 1207 and 1208 in the vertical sweep circuit 502 are relatively high so that a relatively large amplitude deflection wave can be produced by each tube. Accordingly, it is necessary to provide the isolation resistors 1805 and 1808 in coupling the vertical deflection waveform and the pulse waveforms together when these waveforms are applied to the same vertical deflection plates. Since the vertical deflection plates themselves have a considerable capacity to ground the isolating resistors 1805 and 1808 and the circuit capacities produce a considerable amount of integration of the vertical deflection waveform which would round off the corners of the stepped portions of the vertical deflection wave and prevent the traces 570 to 579, inclusive, from appearing as true horizontal traces on the face of the cathode ray tube 520. In accordance with the present invention, the stepped portions of the vertical deflection wave are provided with accentuated peaks due to the action of the condenser 1227 and its associated shunting resistor 1235 and potentiometer 1236, as described in detail heretofore in connection with the vertical sweep circuit 502. Thus, considering the first vertical deflection cycle shown in Fig. 21, the stepped portions of the vertical deflection wave are predistorted to form the sharp peaks 2150, 2151 and 2152 which are integrated in being applied to the deflection plate 1810 to provide substantially horizontal portions, as indicated by the dotted lines 2153, 2154 and 2155 in Fig. 21. In a similar manner the peak portions 2156, 2157 and 2158 in the next vertical deflection cycle are integrated sufficiently by the above described coupling network to provide the substantially horizontal portions indicated in dotted lines at 2159, 2160 and 2161. Furthermore, in the third deflection cycle the peaked portions 2162, 2163, 2164 and 2165 are integrated to provide the portions 2166, 2167, 2168 and 2169.

It will be evident from Fig. 21 that the ten horizontal traces produced from the cathode ray tube 520 are not produced in their numerical order although the order or reproduction of these traces does have a predetermined pattern. Thus, in the first illustrated vertical deflection cycle 2115 in Fig. 21 the step portion 2153 functions to hold the electron beam substantially horizontal during the latter portion of the horizontal sweep cycle 2101 so that the horizontal trace 574 (Fig. 20) is produced on the cathode ray tube 520 corresponding to the time positions assigned to the lines 21, 22–20, inclusive. The next step portion 2154 functions during the horizontal sweep cycle 2102 to provide the horizontal trace 575 corresponding to the time positions assigned to the lines numbered 51, 52–50, inclusive. The third step portion in the first vertical deflection cycle 2115 functions during the latter portion of the horizontal sweep cycle 2103 to provide the horizontal trace 576 on the cathode ray tube 520 corresponding to the time positions assigned to the lines numbered 81, 82–80, inclusive. In the next vertical deflection cycle in Fig. 21 the step portions 2159, 2160 and 2161 cooperate with the corresponding horizontal sweep cycles to provide the horizontal traces 577, 578 and 579 on the cathode ray tube 520 corresponding to the time positions assigned to the indicated lines of the system. In the third vertical deflection cycle in Fig. 21, the step portions 2166, 2167, 2168 and 2169 cooperate with the corresponding horizotnal deflection cycles to produce the horizontal traces 570, 571, 522 and 573 on the cathode ray tube 520.

Since three vertical deflection cycles are required to scan all of the time positions in the predetermined order described above, if a plurality of waveforms are to be simultaneously displayed in any particular time position it is necessary to employ one group of three vertical deflection cycles for each desired waveform. Such action is provided by the gate control tubes, 1600, 1601, 1602 and 1603 which are controlled respectively by the gate pulses 2145, 2146, 2147 and 2148. Thus, when the line 23 comes off hook and multiplexer pulses are produced on the conductor 50 in the time position *64b* assigned to the line 23, these pulses are impressed upon the gate tube 1602 and are transmitted therethrough during the gate pulse intervals of the gate pulses 2146. However, during the first three vertical deflection cycles shown in Fig. 21, the line 23 is not scanned during the gate pulse interval 2146. Similarly, in the second group of three vertical deflection cycles 2200, 2201 and 2202 the gate pulse 2146 does not coincide with the scanning of the time position 64*b* assigned to the line 23. Also, in the third group of vertical deflection cycles, i. e., the deflection cycles indicated generally at 2300, 2301 and 2302 in Fig. 23, the gate pulses 2146 are not produced during any of these vertical deflection cycles so that coincidence with the time position assigned to the line 23 is impossible. However, in the fourth group of vertical deflection cycles, which comprises the vertical deflection cycles 2303, 2400 and 2401, the gate pulse 2146 coincides with the time position assigned to the line 23. More particularly, during the vertical deflection cycle 2303 the horizontal step portion 2453 is produced during which period the time positions assigned to the lines 21, 22–20, inclusive, are scanned along the horizontal trace 574 on the face of the cathode ray tube 520. Accordingly, during the time position 64*b* the multiplexer pulse 590 is impressed upon the vertical deflection plate 1810 of the cathode ray tube 520 so as to display the multiplexer pulse in the correct time position. In a similar manner, when the finder 12*a* becomes operatively associated with the line 23 and produces busy pulses on the conductor 52 in the time position 64*b* assigned to the line 23, these pulses are transmitted through the gate tube 1600 during the period of the gate pulses 2148 which are impressed upon the control grid of this tube. During the vertical deflection cycle indicated generally at 2200 in Fig. 22, the gate pulses 2148 coincide with the time position 64*b* assigned to the line 23 so that during the horizontal step portion 2253, the reproduced busy pulses are impressed upon the vertical deflection plate 1807 so as to produce the negative going busy pulses 591 on the face of the cathode ray tube 520 in the time position 64*b* assigned to the line 23.

As soon as the associated connector 12*b* becomes energized from the +B switching circuit 201 in the finder 12*a*, pulses appearing in the time position assigned to the line 23 are developed on the conductor 51 and are transmitted through the gate tube 1601 during the periods of the gate pulses 2147 impressed upon this tube. During the vertical deflection cycle 2300 shown in Figs. 22 and 23 the time position assigned to the line 23 coincides with the gate pulses 2147 so that as the horizontal trace 574 is developed during the step portion 2353, the connector pulses are impressed upon the vertical deflection plate 1807 so that the connector pulses 592 are displayed as negative going pulses along the trace 574 in the time position assigned to the line 23. It will be evident that if a fourth waveform is developed in the time position 64*b* assigned to the line 23, this waveform may be displayed in the correct time position along the trace 574 during the vertical deflection cycle 2115 and during the period of the horizontal step portion 2153 thereof. It will also be understood that the vertical deflection cycles shown in Figs. 21 to 24, inclusive, are cyclically repeated in the predetermined pattern shown therein so that all of the waveforms may be displayed on the cathode ray tube 520 and due to the relatively high repetition rate of the display cycles and the persistence of vision of the observer all of the waveforms are simultaneously visible.

In Fig. 25 there is shown an alternative embodiment of the present invention wherein the vertical sweep generator of the traffic monitor is substantially simplified while retaining most of the advantages of the arrangement shown and described in detail above in connection with Figs. 1 to 24, inclusive, different displays which may be provided by the system of Fig. 25 being shown in Figs. 26, 27 and 28. More particularly, an arrangement is shown in Fig. 25 wherein a linearly increasing vertical sweep waveform is employed to space the horizontal base lines of the display apart by the desired amount. Thus, as shown in Fig. 26, a linearly increasing vertical deflection waveform will produce a series of base lines 2600 which are tilted slightly due to the fact that the vertical deflection waveform increases linearly during each horizontal trace instead of the stepped waveform described in detail above in connection with the embodiment of Figs. 1 to 24, inclusive. Since it may be undesirable to provide a display wherein the base lines 2600 are tilted in the manner shown in Fig. 26, the cathode ray tube may be bodily rotated by an amount sufficient to position the base lines 2600 substantially horizontally, as shown in Fig. 27. However, when this is done, it will be evident from Fig. 27 that the individual base lines are not lined up vertically but instead are progressively moved to the right as the vertical deflection sweep waveform increases in amplitude. Accordingly, in the preferred arrangement of the system of Fig. 25, a portion of the vertical sweep waveform is introduced into the horizontal sweep voltage so that successive horizontal base lines are displaced to the left by increasing amounts so that all of the base lines 2600 are lined up vertically in the manner shown in Fig. 28. In this connection it will be understood that in the display of Fig. 28 the signal pulses and gate pulses produced at individual time positions along the base lines 2600, such as the indications 590, 591, 592, etc., described above in connection with the embodiment of Figs. 1 to 24, inclusive, will be slightly tilted due to the fact that the vertical deflection plates of the cathode ray tube are not exactly parallel to the base lines 2600. However, such distortion is relatively small since these indications are of relatively small vertical amplitude and a much simpler sweep voltage generator system can be employed to provide the display of Fig. 28.

In order to produce the above described vertical and horizontal sweep waveforms wherein a portion of the vertical sweep waveform is introduced into the horizontal sweep waveform in the correct amount to compensate for tilting of the individual base lines, the horizontal sweep generator 2510 and the vertical sweep generator 2511, shown in Fig. 25 of the drawings are employed. Referring to Fig. 25, positive units pulses are coupled through the condenser 2515 to the control grid of a cathode follower tube 2500 and are reproduced in like polarity across the cathode resistor 2516 of the tube 2500. A blocking oscillator tube 2501 is provided with a blocking oscillator transformer 2517, the winding 2518 of the transformer 2517 being connected to the cathode of the tube 2500 so that the oscillator 2501 is synchronized by the positive units pulses impressed upon the control grid of the tube 2500. Preferably, the oscillator 2500 has a frequency of one-third that of the units pulses so that 30 microsecond negative pulses are developed at the grid of the oscillator tube 2500 in a manner readily understood by those skilled in the art. The control grid of the tube 2500 is connected to the control grid of a sweep generator tube 2502 so that the tube 2502 is cut off for substantially all of each 30 microsecond oscillation cycle, during which interval the condenser 2520 is charged positively from the B+ supply through the resistor 2521 and the horizontal size potentiometer 2522. The positively increasing sawtooth voltage developed across the condenser 2520 is coupled through the condenser 2525 and the resistor 2526 to the control grid of a phase inverter tube 2503. The anode resistor 2527 and the cathode resistor 2528 of the tube 2503 are of identical value so that horizontal sweep voltages of opposite polarity are produced at the anode and cathode of the tube 2503 and are coupled respectively through the condensers 2529 and 2530 to the horizontal output deflection tubes. These horizontal deflection tubes may be substantially identical to the tubes 1105 and 1106 of the horizontal sweep circuit 501 (Fig. 11) so that the desired horizontal deflection voltages are impressed upon the horizontal deflection plates of the cathode ray tube 520.

In the vertical sweep generator 2511, positive tens pulses are coupled through the condenser 2530 to the control grid of a cathode follower tube 2504 and are repeated in like phase across the cathode resistor 2531 of the tube. A vertical blocking oscillator tube 2505 is provided with a coupling transformer 2532 and the oscillator 2505 is synchronized by means of the positive tens pulses impressed upon the control grid of the tube 2504 at a two-to-one ratio so that each oscillation cycle of the oscillator 2505 persists for approximately 200 microseconds. The blocking oscillator voltage developed by the tube 2505 is employed to control a sweep voltage generator tube 2506 so that this tube is held beyond cutoff for the vertical deflection interval during which period the condenser 2535 is charged positively through the resistor 2536 so as to develop a positive vertical deflection sawtooth waveform across the condenser 2535. This vertical deflection waveform is coupled through the condenser 2537 to the control grid of a phase inverter tube 2507 so that positive and negative vertical deflection waveforms are developed at the anode and cathode of the tube 2507. These vertical deflection waveforms are coupled through the condensers 2538 and 2539 respectively, to the vertical deflection output tubes which may be substantially identical to the vertical deflection output tubes 1207 and 1208 described in detail above in connection with Figs. 1 to 24, inclusive.

In order to provide an arrangement wherein the display of Fig. 28 is produced, a portion of the negatively increasing vertical deflection waveform which is developed across the anode resistor 2540 of the tube 2507 is coupled into the horizontal sweep generator 2510. More particularly, a potentiometer 2541 is connected across the resistor 2540 and the negatively increasing vertical deflection voltage which is produced at the arm of the potentiometer 2541 is coupled through the condenser 2542 and the resistor 2543 to the control grid of the phase inverter tube 2503 in the horizontal sweep generator 2510. Accordingly, a portion of the vertical deflection voltage is resistance mixed with the horizontal sweep voltage at the grid of the tube 2503 so as to provide compensation for the horizontal base lines of the display in the manner described above in connection with Figs. 26 to 28, inclusive. The arm of the potentiometer 2541 may then be adjusted as desired so that all of the base lines 2600 are vertically aligned in the manner shown in Fig. 28.

In the alternative embodiment of Fig. 25 a modified retrace blanking circuit 2550 is also provided to extinguish the electron beam of the cathode ray tube 520 except during periods when the horizontal base lines 2600 are to be produced. Thus, the negative 30 microsecond square wave developed at the grid of the oscillator tube 2501 is directly coupled to the grid of a blanking tube 2508 the cathode of which is connected to ground, so that a corresponding 30 microsecond positive square wave is developed across the anode resistor 2555 of the tube 2508. In a similar manner, the negative square wave which is developed at the grid of the tube 2505 during the vertical sweep interval is directly coupled to the control grid of a second blanking tube 2509 the cathode of which is connected to ground, so that a corresponding positive square wave is developed across the anode resistor 2556 of the tube 2509.

In order to determine what portion of the total horizontal sweep interval is to be displayed on the cathode ray tube 520, a condenser 2557 is connected between the anode and cathode of the tube 2508 so as to integrate the positive square wave developed across the resistor 2555 and a diode clipping circuit including the rectifier 2558 and the resistor 2559 is provided to determine the usable sweep portion of the positive square wave developed across the resistor 2555. In a similar manner a voltage clipping circuit including the rectifier 2560 and the resistor 2559 is connected to the anode of the tube 2509 and a condenser 2561 is connected between the anode and cathode of the tube 2509 so as to determine the portion of the vertical waveform which will be used for the display. The clipped voltages developed in the manner described above are coupled through the condenser 2562 to the control grid of the cathode ray tube 520 and a clamping rectifier 2563 is employed to prevent the control grid of the tube 520 from becoming positive with respect to ground so that all blanking voltages are set at ground level.

With regard to the embodiment of Fig. 25, it will be understood that the remaining portions of the system may be substantially identical to those described in detail above in connection with the embodiment of Figs. 1 to 24, inclusive. It will, therefore, be evident that a number of different waveforms related to any one line of the system may be displayed on the base lines 2600 of the display shown in Fig. 28 and in the correct time position corresponding to the time position assigned to that particular line. It will also be noted that relatively simple horizontal and vertical deflection circuits are employed in the system of Fig. 25 to generate the above described display wherein a series of ten horizontal base lines, each separated into the ten time positions corresponding to a subgroup of telephone lines, are simultaneously displayed on the face of the cathode ray tube 520.

While there have been described what are at present considered to be the preferred embodiments of the invention, it will be understood that various modifications may be made therein which are within the true spirt and scope of the invention as defined in the appended claims.

What is claimed as new and is desired to be secured by Letters Patent of the United States is:

1. In an automatic telephone system, a plurality of lines having individually assigned thereto different time positions in repetitive time position frames, electronic means for establishing two-way communication connections between different ones of said lines, and electronic visual display means for simultaneously displaying the switch-hook condition of all of said lines.

2. In an automatic telephone system, a plurality of lines having individually assigned thereto different time positions in repetitive time position frames, electronic means for establishing two-way communication connections between different ones of said lines, and time position responsive visual display means for indicating the switch-hook condition of said lines at a common station.

3. In an automatic telephone system, a plurality of lines having individually assigned thereto different time positions in repetitive time position frames, electronic means for establishing two-way communication connections between different ones of said lines, means for developing a visual display having predetermined areas corresponding to said time positions, and means responsive to said connection establishing means for indicating on said visual display the switch-hook condition of all of said lines.

4. In an automatic telephone system, a plurality of lines having individually assigned thereto different time positions in repetitive time position frames, electronic means for establishing two-way communication connections between different ones of said lines, means for developing a visual display having predetermined areas corresponding to said time positions, and means responsive to an off-hook condition on any one of said lines for indicating said off-hook condition on said visual display in the predetermined area thereof corresponding to the time position assigned to said one line.

5. In an automatic telephone system, a plurality of lines, means for establishing telephonic connections between calling and called ones of said lines, and visual display apparatus for indicating the switch-hook condition of all of said lines at a common station.

6. In an automatic telephone system, a plurality of lines, means for establishing telephonic connections between calling and called ones of said lines, and traffic monitoring means controlled in part by said connection establishing means for simultaneously indicating at a common station the use condition of all of said lines.

7. In an automatic telephone system, a plurality of lines, means for establishing telephonic connections between calling and called ones of said lines, a display device having predetermined areas corresponding to different ones of said lines, and means responsive to the initiation of a call on any one of said lines for producing a call initiating indication on said display device in the area thereof corresponding to said calling line.

8. In an automatic telephone system, a plurality of lines, means for establishing telephonic connections between calling and called ones of said lines, a display device having predetermined areas corresponding to different ones of said lines, means responsive to the initiation of a call on any one of said lines for producing a call initiating indication on said display device in the area thereof corresponding to said calling line, and means responsive to a call answering operation at the called line for producing a call answering indication on said display device in the area thereof corresponding to said called line.

9. In an automatic telephone system, a plurality of lines, means for establishing telephonic connections between calling and called ones of said lines, visual display means having predetermined display areas corresponding to different ones of said lines, and means for simultaneously displaying indications of the idle or busy condition of each of said lines in said predetermined areas of said visual display means.

10. In an automatic telephone system, a plurality of lines, means including a plurality of impulse responsive links for setting up telephonic connections between different ones of said lines, a display device having predetermined display areas corresponding to different ones of said lines, means responsive to the initiation of a call on one of said lines for producing a call initiating indication on said display device in the area thereof corresponding to said calling line, and means responsive to operative association of one of said links with said calling line for producing a link seizing indication on said display device in the area thereof corresponding to said calling line.

11. In an automatic telephone system, a plurality of lines, means including a plurality of impulse responsive links for setting up telephonic connections between different ones of said lines, a display device having predetermined display areas corresponding to different ones of said lines, and means responsive to said connecting means for producing successive indications on said display device in the area thereof corresponding to a calling one of said lines in response to successive call handling operations performed in connection with said calling line.

12. In an automatic telephone system, a plurality of lines, means including a plurality of impulse responsive links for setting up telephonic connections between different ones of said lines, a display device having predetermined display areas corresponding to different ones of said lines, and means responsive to said connecting means for producing successive indications on said display device in the area thereof corresponding to called one of said lines in response to successive call handling operations performed in connection with said called line.

13. In an automatic telephone system, a plurality of lines, means for establishing telephonic connections between calling and called ones of said lines, visual display means having predetermined display areas corresponding to different ones of said lines, and means for producing a line ringing indication on said visual display means in the area thereof corresponding to a called one of said lines when said called line is rung incident to the setting up of a telephonic connection.

14. In an automatic telephone system, a plurality of lines, means for establishing telephonic connections between calling and called ones of said lines, visual display means having predetermined display areas corresponding to different ones of said lines, means for transmitting a ringing signal over any called one of said lines, and means for producing a ringing signal indication on said visual display means in the area thereof corresponding to said called line during periods when said ringing signal is transmitted over said called line.

15. In an automatic telephone system, a plurality of lines, means for establishing telephonic connections between calling and called ones of said lines, visual display means having predetermined areas corresponding to different ones of said lines, means for transmitting a ringing signal over any called one of said lines, means for producing a ringing signal indication on said display means in the area thereof corresponding to said called line, and means for producing a call answering indication on said visual display means in the area thereof corresponding to said called line when a call answering operation is performed on said called line.

16. In an automatic telephone system, a plurality of lines, means including a plurality of impulse responsive links for setting up telephonic connections between different ones of said lines, a display device having predetermined display areas corresponding to different ones of said lines, means responsive to operative association of one of said links with a calling one of said lines for busying said calling line to the other links, and means controlled by said line busying means for producing a line busying indication on said device in the area thereof corresponding to said calling line.

17. In an automatic telephone system, a plurality of lines having individually assigned thereto different time positions in repetitive time position frames, visual display means having predetermined areas corresponding to said time positions, and means responsive to the initiation of a call on one of said lines for producing an indication on said display means in the area thereof corresponding to the time position assigned to said calling line.

18. In an automatic telephone system, a plurality of lines having individually assigned thereto different time positions in repetitive time position frames, visual display means having predetermined areas corresponding to said time positions, means responsive to the initiation of a call on one of said lines for developing pulses in the time position assigned to said calling line, and means for displaying said developed pulses on said visual display means in the area thereof corresponding to the time position assigned to said calling line.

19. In an automatic telephone system, a plurality of lines having individually assigned thereto different time positions in repetitive time position frames, visual display means having predetermined areas corresponding to said time positions, means responsive to the initiation of a call on one of said lines for developing pulses in the time position assigned to said calling line, and means for producing an indication on said visual display means in the area thereof corresponding to the time position assigned to said calling line and representing said developed pulses.

20. In an automatic telephone system, a plurality of lines having individually assigned thereto different time positions in repetitive time position frames, visual display means having predetermined areas corresponding to said time positions, means responsive to the initiation of a call on one of said lines for developing pulses in the time position assigned to said calling line, means for displaying said developed pulses on said visual display means in the area thereof corresponding to the time position assigned to said calling line, and means for varying a characteristic of said displayed pulses in accordance with signals transmitted over said calling line.

21. In an automatic telephone system, a plurality of lines having individually assigned thereto different time positions in repetitive time position frames, said lines being divided into subgroups and the lines in each subgroup having consecutive ones of said time positions assigned thereto, means for establishing telephonic connections between different ones of said lines, visual display means having predetermined areas corresponding to said subgroups, means for scanning said predetermined areas of said visual display means in predetermined order, and means controlled by said connecting means for producing call progress indications in said predetermined areas of said visual display means in accordance with the time positions individually assigned to calling and called ones of said lines.

22. In an automatic telephone system, a plurality of lines having individually assigned thereto different time positions in repetitive time position frames, pulse generating means for developing gate pulses in each of said time positions, means controlled in part by said gate pulses for establishing telephonic connections between different ones of said lines, visual display means having predetermined areas for different ones of said lines, means for scanning said predetermined areas of said visual display means in synchronism with said pulse generating means, and means controlled by said connecting means for producing call progress indications in said predetermined areas of said visual display means in accordance with the time positions individually assigned to calling and called ones of said lines.

23. In an automatic telephone system, a plurality of lines having individually assigned thereto different time positions in repetitive time position frames, pulse generating means for developing gate pulses in each of said time positions, means controlled in part by said gate pulses for establishing telephonic connections between different ones of said lines, visual display means having predetermined areas for different ones of said lines, means for scanning said predetermined areas of said visual display means in synchronism with said pulse generating means, means responsive to the initiation of a call on one of said lines for developing pulses in the time position assigned to said calling line, and means for producing an indication representing said developed pulses on said visual display means in the predetermined area thereof corresponding to said calling line.

24. In an automatic telephone system, a plurality of lines having individually assigned thereto different time positions in repetitive time position frames, pulse generating means for developing gate pulses in each of said time positions, means controlled in part by said gate pulses for establishing telephonic connections between different ones of said lines, visual display means having predetermined areas for different ones of said lines, means for scanning said predetermined areas of said visual display means in synchronism with said pulse generating means, means responsive to the initiation of a call on one of said lines for developing pulses in the time position assigned to said calling line, means for modulating said developed pulses in accordance with signals transmitted over said calling line, and means for producing an indication representing said modulated pulses on said visual display means in the predetermined area thereof corresponding to said calling line.

25. In an automatic telephone system, a plurality of lines having individually assigned thereto different time positions in repetitive time position frames, pulse generating means for developing gate pulses in each of said time positions, means controlled in part by said gate pulses for establishing telephonic connections between different ones of said lines, visual display means having predetermined areas for different ones of said lines, means for scanning said predetermined areas of said visual display means in synchronism with said pulse generating means, means responsive to the initiation of a call on one of said lines for developing calling line pulses in the time position assigned to said calling line, means responsive to the transmission call directing impulses over said calling line for selecting a called one of said lines, means for developing called line pulses in the time position assigned to said called line, means for producing a first indication representing said calling line pulses on said visual display means in the area thereof corresponding to said calling line, and means for producing a second indication representing said called line pulses on said visual display means in the area thereof corresponding to said called line.

26. In an automatic telephone system, a plurality of lines arranged in different subgroups, means for establishing telephone connections between different ones of said lines, a visual display device having a screen, means for producing a plurality of substantially parallel traces on said screen, each of said traces corresponding to one of said line subgroups, and means responsive to the initiation of a call on any one of said lines for modulating that one of said traces which corresponds to the calling line subgroup to produce an indication on said screen of the initiation of said call.

27. In an automatic telephone system, a plurality of lines arranged in different subgroups, means for establishing telephone connections between different ones of said lines, a visual display device having a screen, means for producing a plurality of substantially parallel traces on said screen, each of said traces corresponding to one of said line subgroups, successive portions of each of said traces being assigned to successive lines in each of said subgroups, and means responsive to the initiation of a call on any one of said lines for modulating that one of said traces which corresponds to the calling line subgroup in the portion thereof corresponding to said calling line to produce an indication on said screen of the initiation of said call.

28. In an automatic telephone system, a plurality of lines having individually assigned thereto different time positions in repetitive time position frames, units pulse generating means for repetitively generating units pulses in each of the said time positions, group pulse generating means for generating a series of group pulses during each time position frame, each of said group pulses spanning a group of said units pulses, means including apparatus jointly controlled by said group and units pulses for setting up two-way communication connections between different ones of said lines, a cathode ray tube having a screen, means controlled by said units pulse generating means for deflecting the beam of said cathode ray tube horizontally, means controlled by said group pulse generating means for deflecting the beam of said cathode ray tube vertically, thereby to produce on said screen a series of substantially parallel spaced-apart traces corresponding to the intervals of said group pulses, means for developing an indicating signal during the time position assigned to one of said lines, and means for deflecting the beam of said cathode ray tube in accordance with said indicating signal to produce an indication on said screen which is identifiable with said one line.

29. In an automatc telephone system, a plurality of lines having individually assigned thereto different time positions in repetitive time position frames, units pulse generating means for repetitively generating units pulses in each of said time positions, group pulse generating means for generating a series of group pulses during each time position frame, each of said group pulses spanning a group of said units pulses, means including apparatus jointly controlled by said group and units pulses for setting up two-way communication connections between different ones of said lines, a cathode ray tube having a screen, means controlled by said units and group pulse generating means for producing a series of substantially parallel spaced-apart traces on said screen, each of said traces having a duration at least as great as one of said group pulses and successive ones of said traces representing successive ones of said group pulses, means for developing an indicating signal during the time position assigned to one of said lines, and means for deflecting the beam of said cathode ray tube in accordance with said indicating signal to produce an indication on said screen which is identifiable with said one line.

30. In an automatic telephone system, a plurality of lines having individually assigned thereto different time positions in repetitive time position frames, units pulse generating means for repetitively generating units pulses in each of said time positions, group pulse generating means for generating a series of group pulses during each time position frame, each of said group pulses spanning a group of said units pulses, means including apparatus jointly controlled by said group and units pulses for setting up two-way communication connections between different ones of said lines, a cathode ray tube having a screen, first scanning means for deflecting the beam of said cathode ray tube in one direction, means for synchronizing said first scanning means with said units pulse generating means, second scanning means for deflecting the beam of said cathode ray tube in a direction perpendicular to said one direction, means for synchronizing said second scanning means with said group pulse generating means, means for feeding a portion of the voltage developed by said second scanning means into said first scanning means, thereby to produce a series of substantially parallel, horizontal, spaced-apart traces on said screen, and means for deflecting the beam of said cathode ray tube in accordance with signals developed by said apparatus in the time positions assigned to calling and called ones of said lines.

References Cited in the file of this patent

UNITED STATES PATENTS

| | | |
|---|---|---|
| 2,413,001 | Schneckloth | Dec. 24, 1946 |
| 2,474,040 | Day | June 21, 1949 |
| 2,487,191 | Smith | Nov. 8, 1949 |
| 2,680,210 | Miller et al. | June 1, 1954 |
| 2,686,276 | Anderson | Aug. 10, 1954 |
| 2,709,722 | Rosene | May 3, 1955 |